US011893482B2

(12) United States Patent
Zhou et al.

(10) Patent No.: US 11,893,482 B2
(45) Date of Patent: Feb. 6, 2024

(54) IMAGE RESTORATION FOR THROUGH-DISPLAY IMAGING

(71) Applicant: Microsoft Technology Licensing, LLC, Redmond, WA (US)

(72) Inventors: Yuqian Zhou, Urbana, IL (US); Timothy Andrew Large, Bellevue, WA (US); Se Hoon Lim, Bellevue, WA (US); Neil Emerton, Redmond, WA (US); Yonghuan David Ren, El Cerrito, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 224 days.

(21) Appl. No.: 16/799,597

(22) Filed: Feb. 24, 2020

(65) Prior Publication Data
US 2021/0152734 A1 May 20, 2021

Related U.S. Application Data

(60) Provisional application No. 62/935,367, filed on Nov. 14, 2019.

(51) Int. Cl.
*G06N 3/08* (2023.01)
*G06T 5/50* (2006.01)
(Continued)

(52) U.S. Cl.
CPC ............ *G06N 3/08* (2013.01); *G06F 18/214* (2023.01); *G06N 20/00* (2019.01); *G06T 5/002* (2013.01);
(Continued)

(58) Field of Classification Search
CPC .... H04N 5/23222; H04N 5/247; H04N 7/144; H04N 23/64; H04N 23/90; G06K 9/6256;
(Continued)

(56) References Cited

U.S. PATENT DOCUMENTS 8,022,977 B2 9/2011 Kanade et al.
9,057,931 B1 6/2015 Baldwin
(Continued)

FOREIGN PATENT DOCUMENTS

| CN | 107580092 A | 1/2018 |
| CN | 108600465 A | 9/2018 |
| CN | 111741281 A | 10/2020 |

OTHER PUBLICATIONS

Agustsson, et al., "NTIRE 2017 Challenge on Single Image Super-Resolution: Dataset and Study", in Proceedings of the IEEE Conference on Computer Vision and Pattern Recognition, Jul. 21, 2017, pp. 126-135.
(Continued)

*Primary Examiner* — Michael S Osinski
(74) *Attorney, Agent, or Firm* — Alleman Hall Creasman & Tuttle LLP

(57) ABSTRACT

Examples are disclosed that relate to the restoration of degraded images acquired via a behind-display camera. One example provides a method of training a machine learning model, the method comprising inputting training image pairs into the machine learning model, each training image pair comprising an undegraded image and a degraded image that represents an appearance of the undegraded image to a behind-display camera, and training the machine learning model using the training image pairs to generate frequency information that is missing from the degraded images.

7 Claims, 24 Drawing Sheets

(51) Int. Cl.
  *G06N 20/00* (2019.01)
  *G06T 5/00* (2006.01)
  *G06F 18/214* (2023.01)
  *H04N 23/60* (2023.01)
  *G06V 10/764* (2022.01)
  *G06V 10/774* (2022.01)
  *G06V 10/82* (2022.01)
  *G06V 10/44* (2022.01)
  *G06V 40/16* (2022.01)

(52) U.S. Cl.
  CPC .............. *G06T 5/003* (2013.01); *G06T 5/50* (2013.01); *G06V 10/764* (2022.01); *G06V 10/774* (2022.01); *H04N 23/64* (2023.01); *G06V 10/454* (2022.01); *G06V 10/82* (2022.01); *G06V 40/161* (2022.01)

(58) Field of Classification Search
  CPC ...... G06K 9/0051; G06K 9/6271; G06N 3/08; G06N 20/00; G06N 3/0454; G06N 3/045; G06T 5/002; G06T 5/003; G06T 5/50; G06T 2207/10024; G06T 2207/20081; G06T 2207/20084; G06T 5/001; G06V 10/82; G06V 10/30; G06V 10/764; G06V 10/774; G06V 10/454; G06V 40/161; G06F 18/214
  See application file for complete search history.

(56) References Cited

U.S. PATENT DOCUMENTS

| | | | | |
|---|---|---|---|---|
| 9,392,219 | B2* | 7/2016 | Robinson | G09G 3/3406 |
| 10,331,164 | B2* | 6/2019 | Bao | G06F 1/1686 |
| 10,817,991 | B2* | 10/2020 | Reddy | G06T 5/50 |
| 10,911,656 | B2* | 2/2021 | McMillan | H04N 7/144 |
| 10,949,952 | B2* | 3/2021 | Huang | G06T 5/003 |
| 11,037,278 | B2* | 6/2021 | Zamir | G06N 20/00 |
| 2003/0095080 | A1* | 5/2003 | Colmenarez | G06T 5/002 |
| | | | | 345/7 |
| 2004/0257473 | A1* | 12/2004 | Miyagawa | H04N 7/144 |
| | | | | 348/571 |
| 2007/0120879 | A1* | 5/2007 | Kanade | H04N 7/144 |
| | | | | 346/107.2 |
| 2008/0106591 | A1* | 5/2008 | Border | H04N 7/144 |
| | | | | 348/E7.078 |
| 2008/0292151 | A1* | 11/2008 | Kurtz | A61B 5/442 |
| | | | | 382/128 |
| 2011/0285680 | A1* | 11/2011 | Nakamura | H04N 7/144 |
| | | | | 345/207 |
| 2011/0298953 | A1* | 12/2011 | Nakamura | H04N 7/144 |
| | | | | 348/241 |
| 2012/0269445 | A1* | 10/2012 | Matsunobu | G06F 16/5862 |
| | | | | 382/199 |
| 2012/0281009 | A1* | 11/2012 | Ward | H04N 19/30 |
| | | | | 345/589 |
| 2013/0294689 | A1* | 11/2013 | Jia | H04N 19/124 |
| | | | | 382/166 |
| 2014/0293076 | A1* | 10/2014 | Hiasa | H04N 5/23248 |
| | | | | 348/208.99 |
| 2015/0070500 | A1* | 3/2015 | Pflug | H04N 9/0451 |
| | | | | 348/148 |
| 2015/0093027 | A1* | 4/2015 | Hasegawa | H04N 9/646 |
| | | | | 382/167 |
| 2017/0142290 | A1* | 5/2017 | Fuse | H04N 1/4092 |
| 2017/0213327 | A1* | 7/2017 | Edgar | G06T 5/001 |
| 2018/0048795 | A1* | 2/2018 | Shintani | H04N 5/243 |
| 2018/0293496 | A1* | 10/2018 | Vogels | G06N 3/0472 |
| 2018/0350090 | A1 | 12/2018 | Evans et al. | |
| 2019/0170646 | A1* | 6/2019 | Fiolka | G01N 21/6458 |
| 2019/0223725 | A1* | 7/2019 | Lu | G06N 3/044 |
| 2019/0259139 | A1* | 8/2019 | Ichihashi | G06T 7/579 |
| 2019/0295223 | A1* | 9/2019 | Shen | G06N 3/045 |
| 2019/0355103 | A1* | 11/2019 | Baek | G06N 3/088 |
| 2020/0051217 | A1* | 2/2020 | Shen | G06N 3/04 |
| 2020/0051260 | A1* | 2/2020 | Shen | G06N 20/00 |
| 2020/0074674 | A1* | 3/2020 | Guo | G06T 7/50 |
| 2020/0110961 | A1* | 4/2020 | Andilla | G06N 3/08 |
| 2020/0219248 | A1* | 7/2020 | Kaneko | G06K 9/6271 |
| 2020/0226718 | A1* | 7/2020 | Reddy | G06T 5/002 |
| 2020/0334789 | A1* | 10/2020 | Zhang | H04N 5/23296 |
| 2020/0349680 | A1* | 11/2020 | Tao | H04N 23/683 |
| 2020/0389576 | A1* | 12/2020 | Newman | H04N 5/217 |
| 2021/0035331 | A1* | 2/2021 | Xie | H04N 19/625 |
| 2021/0097650 | A1* | 4/2021 | Kobayashi | G06T 5/003 |
| 2021/0112261 | A1* | 4/2021 | Hwang | H04N 19/186 |
| 2021/0166350 | A1* | 6/2021 | Wang | G06F 18/214 |
| 2021/0166391 | A1* | 6/2021 | Hermosillo Valadez | G06T 7/0016 |
| 2021/0225047 | A1* | 7/2021 | Pawar | G06N 3/045 |
| 2021/0368081 | A1* | 11/2021 | Kim | H04N 5/2257 |
| 2021/0390696 | A1* | 12/2021 | Iwase | G06T 5/00 |
| 2022/0036523 | A1* | 2/2022 | Moran | G06T 5/009 |
| 2022/0245775 | A1* | 8/2022 | Wang | G06T 5/50 |
| 2022/0292647 | A1* | 9/2022 | Sunwoo | G06T 5/50 |
| 2023/0025557 | A1* | 1/2023 | Wang | G06T 5/20 |

OTHER PUBLICATIONS

Lim, et al., "Enhanced Deep Residual Networks for Single Image Superresolution", in Proceedings of the IEEE Conference on Computer Vision and Pattern Recognition, Jul. 22, 2017, pp. 136-144.

Liu, et al., "Learning Raw Image Denoising with Bayer Pattern Unification and Bayer Preserving Augmentation", In Proceedings of the IEEE/CVF Conference on Computer Vision and Pattern Recognition, Jun. 16, 2019, 08 Pages.

Orieux, et al., "Bayesian Estimation of Regularization and PSF Parameters for Wiener—Hunt Deconvolution", In Journal of Optical Society of America A, vol. 27, Issue 7, Jul., 2010, pp. 1593-1607.

Simonyan, et al., "Very deep convolutional networks for large-scale image recognition", In Proceedings of International Conference on Learning Representations, May 7, 2015, 14 Pages.

Venkataraman, et al., "PiCam: An Ultra-Thin High Performance Monolithic Camera Array", In Journal of ACM Transactions on Graphics, vol. 32, Issue 6, Nov. 2013, 13 Pages.

Zhang, et al., "The Unreasonable Effectiveness of Deep Features as a Perceptual Metric", In Proceedings of IEEE Conference on Computer Vision and Pattern Recognition, Jun. 18, 2018, pp. 586-595.

Zhou, et al., "When AWGN-based Denoiser Meets Real Noises", In Journal of Computing Research Repository, Apr. 6, 2019, 10 Pages.

Omiya, et al., "Learning Photo Enhancement by Black-Box Model Optimization Data Generation", In SIGGRAPH Asia Technical Briefs, Dec. 4, 2018, 4 Pages.

Romano, et al., "RAISR: Rapid and Accurate Image Super Resolution", In IEEE Transactions on Computational Imaging, vol. 3, No. 1, Jan. 2017, pp. 110-125.

William, et al., "An Example-Based Super-Resolution Algorithm for Selfie Images", In Journal of the Scientific World, Mar. 15, 2016, 13 Pages.

Lai, Richard, "Oppo and Xiaomi Show Off their Under-Display Selfie Cameras (updated)", Retrieved from https://www.engadget.com/2019/06/03/oppo-under-screen-selfie-camera-demo/, Jun. 3, 2019, 11 Pages.

Schroeder, Stan, "Oppo's Under-Display Camera is Now Official, Here's How it Works", Retrieved from https://web.archive.org/web/20200225060721/https://mashable.com/article/oppo-under-display-camera-official/?europe=true, Jun. 26, 2019, 7 Pages.

"International Search Report and Written Opinion Issued in PCT Application No. PCT/US20/057436", dated Feb. 8, 2021, 14 Pages.

Lorincz, et al., "Single View Distortion Correction using Semantic Guidance", In Proceedings of the 2019 International Joint Conference on Neural Networks, Jul. 14, 2019, 6 Pages.

Zhou, et al., "Image Restoration for Under-Display Camera", In arxiv.org, Cornell University Library, Mar. 10, 2020, 17 Pages.

(56) References Cited

OTHER PUBLICATIONS

Xiang, Wang, "Xiaomi's Under-Display Camera Technology could be the Ultimate Solution for a Full Screen Display Coexisting with a Front Camera! RT if you Love It", Jun. 3, 2019, 3 Pages, Retrieved from: https://twitter.com/XiangW_/status/1135515148423012353/photo/1?ref_src=twsrc%5Etfw%7Ctwcamp%5Etweetembed%7Ctwterm%5E1135515148423012353&ref_url=https%3A%2F%2Fwww.indiatoday.in%2Ftechnology%2Fnews%2Fstory%2Fxiaomi-s-in-display-camera-technology-explained-a-clever-transparent-glass-makes-notches-history-1544030-2019-06-06.

* cited by examiner

| | | 2402 |
|---|---|---|
| RGB | RGB | RGB |
| RGB | RGB | RGB |
| RGB | RGB | RGB |

| | | 2406 |
|---|---|---|
| R | G | B |
| G | B | R |
| B | R | G |

| | | 2410 |
|---|---|---|
| C | M | Y |
| M | Y | C |
| Y | C | M |

| | | 2404 |
|---|---|---|
| RGB | RGB | RGB |
| RGB | Wide | RGB |
| RGB | RGB | RGB |

| | | 2408 |
|---|---|---|
| R | G | B |
| W | Wide | W |
| B | R | G |

| | | 2412 |
|---|---|---|
| C | M | Y |
| W | Y | W |
| Y | C | M |

| | | 2414 |
|---|---|---|
| C | M | Y |
| W | Wide | W |
| Y | C | M |

FIG. 24

IMAGE RESTORATION FOR THROUGH-DISPLAY IMAGING

CROSS-REFERENCE TO RELATED APPLICATIONS

This application claims priority to U.S. Provisional Patent Application Ser. No. 62/935,367, filed Nov. 14, 2019, the entirety of which is hereby incorporated herein by reference for all purposes.

BACKGROUND

Computing devices often include a user-facing camera configured to acquire image and/or video data of a device user, e.g. for video conferencing and self-portrait imaging. Examples of such computing devices include smartphones, tablet computers, laptop computers, and desktop computers. User-facing cameras are often located in a bezel portion of a device, adjacent to a display screen.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

Examples are disclosed that relate to machine-learning based methods of image restoration for through-display imaging. One disclosed example provides a method of training a machine learning model. The method comprises inputting training image pairs into the machine learning model, each training image pair comprising an undegraded image and a degraded image that represents an appearance of the undegraded image to a behind-display camera, and training the machine learning model using the training image pairs to generate frequency information that is missing from images acquired via the behind-display camera.

Another disclosed example provides a computing device comprising a display, a camera positioned behind the display, a logic subsystem, and a storage subsystem storing instructions executable by the logic subsystem to acquire an image through the display via the camera, input the image into a machine learning model trained on degraded and undegraded image pairs, and output, via the machine learning model, a restored image comprising generated information in a frequency region of the image that is degraded due to having acquiring the image through the display.

BRIEF DESCRIPTION OF THE DRAWINGS

FIG. 24 shows schematic depictions of various example arrangements of color filters on an example 3×3 camera array.

DETAILED DESCRIPTION

Figure 2:
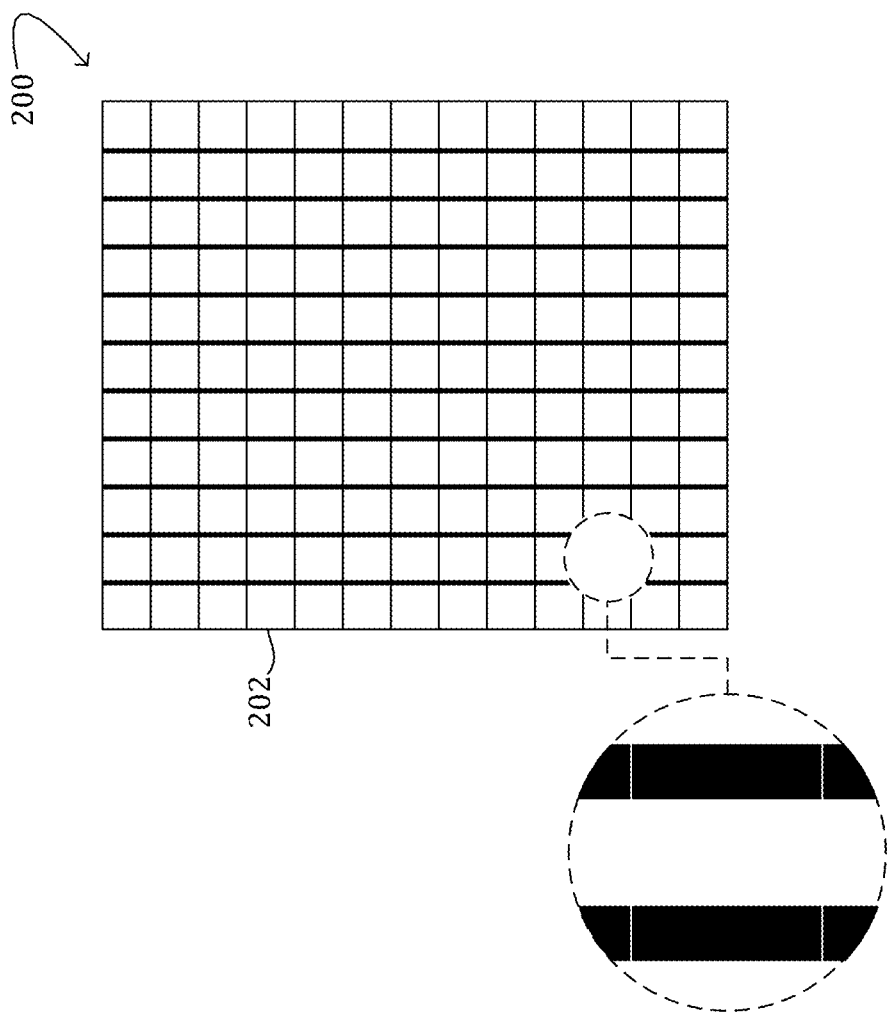
FIG. 2 shows a schematic depiction of pixels of a transparent light emitting device (tOLED) display comprising slits for through-display imaging.

User-facing cameras positioned in the bezel portion of a display may provide an unintuitive user experience for video conference/chat applications, as a user must maintain eye contact with the camera rather than a displayed image of a communication partner in order to maintain a semblance of "eye contact" with the communication partner. Similarly, a camera positioned adjacent to a display may be cumbersome during self-portrait capture, as a user may be unable to both gaze at the camera and a displayed camera stream. Placement of a camera in a device bezel also may pose constraints on bezel width and display area for a given display body size.

To address such issues, a camera may be positioned behind a device display, and capture images through the display. This may allow the use of a thinner bezel, and thus allow for a larger display area, for a given display body size. Such a behind-display camera also may provide for more natural gaze interactions for video conference/chat applications (as the camera may be positioned near or at a displayed image of a communication partner) and a more intuitive self-portrait experience.

However, capturing images through a display may be challenging, as positioning the display in front of a camera aperture may result in lower light transmission, lens occlusion, and diffraction, all of which may degrade image quality. For example, to allow imaging to be performed through an organic light emitting diode (OLED) display, an OLED pixel array may comprise a slit formed in each RGB pixel. Thus, light that enters the camera through the array of slits is diffracted by the slit pattern. The resulting images may be low-illuminated, noisy, and blurry, and thus may be unsuitable for face processing and other machine vision tasks.

Various methods of deconvolution have been used to compensate for blur in an image. Such methods may be combined with denoising algorithms to perform deblurring and denoising. Deconvolution, in the Fourier transform domain, boosts degraded signals by a multiplier to improve image quality. However, in instances where a camera acquires an image through a sufficiently narrow slit or other obstacle (e.g., a slit that comprises an area less than 50% of the pixel area, and/or comprises a width that is less than 50% of the pixel pitch), information may be completely lost. For example, for an image captured from behind an array of sufficiently narrow slits, a Fourier transform of the image may include a gap that contains little to no frequency data. The narrower the slit in the pixel structure, the broader this gap of missing data becomes. Further, the gap appears in the middle of the frequency band, where the eye may be most sensitive to missing information. Thus, the missing data may render the image quality unsuitable for self-portrait capture or video conferencing applications. When image information is totally lost in this manner, methods of deconvolution are unable to recover the missing information, as multiplying a signal of 0 by a multiplier returns a 0 signal.

Machine learning-based methods are used in some image upscaling applications. For example, convolutional neural networks have been used to upscale high-definition (or lower resolution) video content for display via a 4K or other ultra-high definition television by generating additional high frequency information (harmonics) and combining the harmonics with the high-definition video content. However, such techniques "fill in" additional detail-level image information at the extremities of a frequency band, and information at the middle of the frequency band is intact.

Accordingly, examples are disclosed that relate to machine learning-based methods of image restoration. Briefly, the disclosed examples provide a data acquisition pipeline for data preparation, namely, gathering training image pairs comprising degraded (blurry, noisy, and/or hazy) and undegraded (sharp) images to train an image restoration machine learning model. The term "image restoration" as used herein may encompass deblurring and denoising, as well as dehazing and/or color restoration/mapping processes, in various examples. Further, the term "training image pairs" and the like signifies that at least two versions of an image (one undegraded and one degraded) are used in training a model, and does not exclude the use of three or more versions of an image that include such a pair. The disclosed examples also provide a mechanism to generate synthetic training data utilizing computational methods to understand the modeling and degradation process of through-display imaging, in addition or alternatively to manually gathering undegraded/degraded image sets. Synthetic data may synthesize degradations caused by a display in a manner that is consistent with real data, and may also help the image restoration machine learning model generalize to more display aperture patterns. The image restoration machine learning model is trained to achieve a real-time inference from through-display image frames. When deployed on a live video system comprising a behind-display camera, the image restoration machine learning model receives input of an image acquired by the camera, generates frequency information that is missing in the image, denoises the image, and outputs a restored image. In some examples, the image restoration machine learning model may be configured to output restored images at a frame rate sufficiently close to video capture, e.g. to output restored, plausible image frames in real-time or near real-time.

Figure 1:
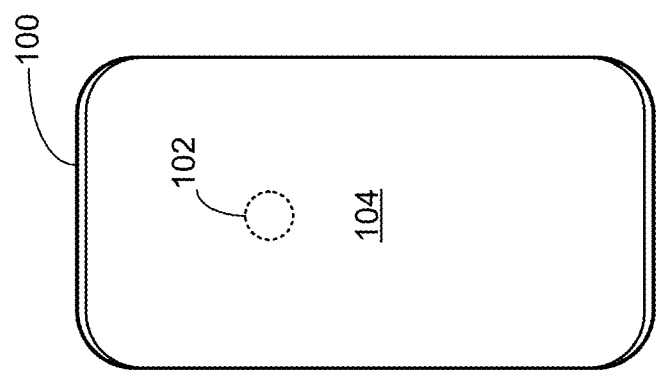
FIG. 1 schematically shows an example computing device comprising a behind-display camera.

Prior to discussing these examples, FIG. 1 depicts an example computing device 100 in the form of a smartphone comprising a camera 102 positioned behind a display 104. Due to the camera position behind the display 104, a size of the display is not constrained by placement of the camera and placement of the camera 102 is not constrained to an area adjacent to the display 104. Thus, the display 104 shown in FIG. 1 comprises a size that extends substantially an entire area of a display side of the computing device 100, and the camera is positioned at or near an estimated level at which the eyes of a video conference participant may appear on the display 104, and/or the estimated location of a user's head displayed in a self-portrait imaging mode. Such a camera placement may help to provide more intuitive user experiences. In other examples, the camera 102 may be positioned in any other suitable location behind the display 104.

While depicted as a smartphone in FIG. 1, in other examples a computing device having a behind-display camera may take any other suitable form. Examples of such computing devices include tablet computers, laptop computers, televisions, video conferencing devices, computer monitors, and desktop computers (including all-in-one desktop computers).

Continuing with FIG. 1, the camera 102 comprises a visible light (RGB or grayscale) image sensor and/or a near infrared (NIR) image sensor (e.g. RGB-IR). In some examples, the camera 102 may comprise a complementary metal oxide semiconductor (CMOS) image sensor and microlens array. In other examples, the camera may comprise a charge-coupled device (CCD). Further, in other examples, other optics in addition to or alternatively to a microlens array may be used. Additionally, in some examples a computing device may include multiple cameras in a stereoscopic arrangement, e.g. to obtain both intensity image data and depth image data, and/or may include one or more depth cameras (e.g. time-of-flight and/or structured light depth sensors). In yet other examples, when the numerical aperture is limited due to constraints on the total optical track length (TOTR), a computing device may include an array of cameras to increase a light collecting capability of a behind-display imaging system and thereby achieve higher signal-to-noise ratios without increasing a total optical track length (TOTR) of the imaging system. Some such examples are described in more detail below.

The display 104 comprises a plurality of pixels arranged in a pixel array. In some examples, the pixel array may take the form of an OLED, such as a transparent OLED (tOLED) or a pentile OLED (pOLED). In other examples, the display 104 may take the form of a liquid crystal display (LCD). While LCDs use backlights for illumination, pixels of OLEDs produce their own light and thus may have reduced reflection effects for through-display imaging compared to LCDs. Further, tOLEDs utilize transparent material to enable light to be emitted from both sides of the display. It will be understood that while examples are described herein in the context of tOLED and pOLED displays, the disclosed methods and systems are also applicable to other display contexts.

In some examples, the display 104 comprises a flexible/bendable display. A flexible/bendable display may comprise, e.g., a polyamide substrate on which the OLED is formed. Such a substrate may appear yellow in transmission. Thus, images captured through a polyamide-containing display panel by a behind-display camera may also appear yellow. An image restoration machine learning model as described herein may be trained to perform color restoration as part of an image restoration process, e.g. based on training data comprising images captured through the yellow-hued display panel and images not captured through the yellow-hued display panel.

FIG. 2 shows a schematic depiction of a plurality of pixels of an example tOLED configured for through-display imaging. The depicted tOLED display 200 comprises a vertical stripe pixel layout, and each pixel 202 comprises a vertically oriented slit through which a camera views the outside world. In some examples, an open area fraction of each pixel 202 may be on the order of 20-22% of the pixel area, resulting in an approximately 20% light transmission rate. In other examples, the open area fraction of each pixel and/or the light transmission rate may have values other than these, whether higher or lower. The narrower the slit for a transmission area of each pixel 202, the less light enters the camera positioned behind the slit. Such loss of light may result in unwanted noise, as well as in diffraction-related blurring and loss of frequency information. In other examples, any other suitable array of slits may be used. The term "slit" as used herein refers to any opening in a pixel through which imaging may be performed, and does not imply any particular shape or orientation of the opening.

Figure 3:
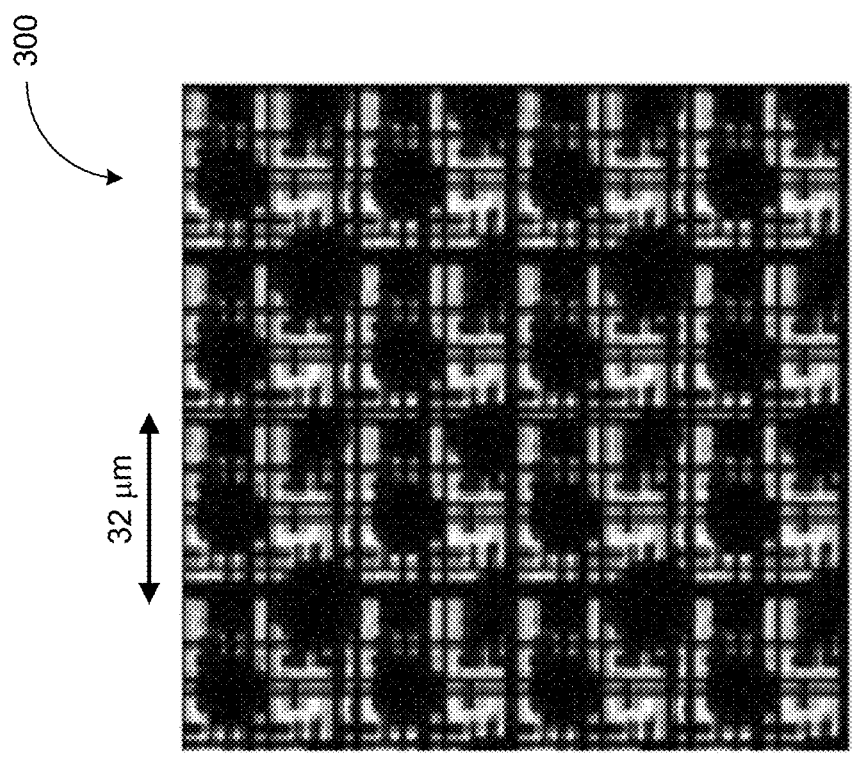
FIG. 3 shows an optical transmission microscope image of an example pentile organic light emitting device (pOLED) display.

FIG. 3 shows an optical transmission microscope image of an example pOLED display 300 suitable for use as display 104. The pOLED display 300 comprises a pentile pixel layout comprising a 23% open area fraction. The pOLED sub-pixel design follows a RGBG matrix structure, and demonstrates a more complex pixel layout than the tOLED display 200. While the open fraction area of the pOLED display 300 is 2% larger than the open fraction area of the tOLED display 200, light transmission for the pOLED display 300 may be significantly lower. The light transmission rate for the example pOLED display 300, measured with a spectrophotometer and white light source, was ~2.9%. This relatively low value may be attributed to various factors, such as transparent traces that may scatter and diffract light, external Fresnel reflections, a circular polarizer, and/or a substrate (e.g., various glasses or plastics, which may absorb in some regions of the visible spectrum, for example) of the display panel. The low light transmission translates to less light reaching the camera lens, causing a relatively lower signal-to-noise ratio (SNR) compared to the tOLED display 200.

As mentioned above, various problems that affect image quality may arise due to through-display imaging, including low light transmission rate (dark visual field), high-level complicated noise, severe diffraction effects (blur), color shift (color transform), and/or other complicated degradations, as examples. In the examples of FIGS. 2 and 3, images captured from behind the tOLED display 200 may exhibit degradation due to blur (horizontal) and noise, and images captured from behind the pOLED display 300 may experience degradation due to noise, haze, and low-light transmission.

Figure 4:
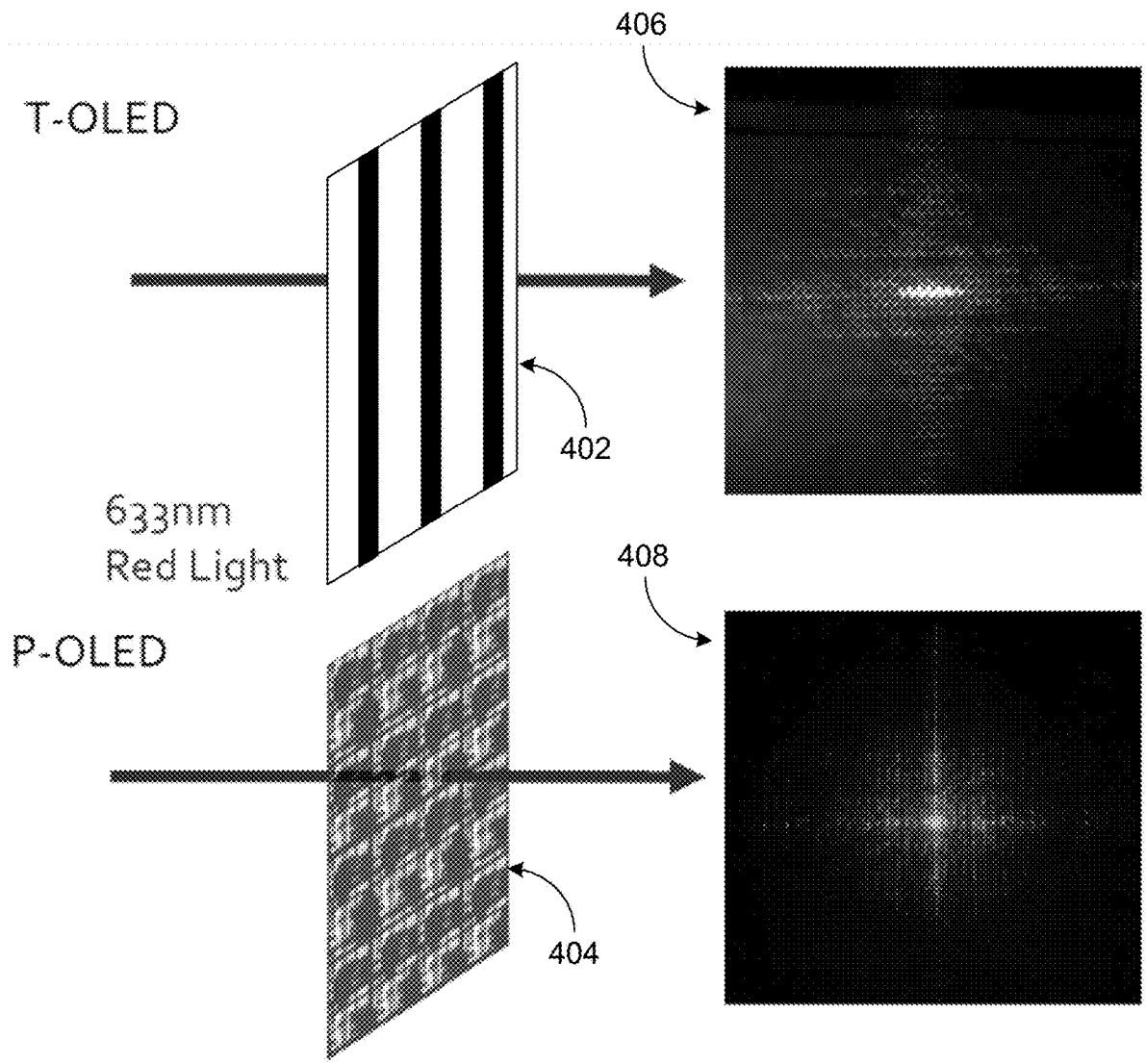
FIG. 4 shows example diffraction patterns obtained by illuminating example tOLED and pOLED displays with coherent red light.

FIG. 4 shows example diffraction patterns obtained by illuminating an example tOLED display 402 and an example pOLED display 404 with coherent red light in a wavelength of 633 nanometers (nm), revealing the point spread function (PSF) of each through-display imaging system. The tOLED display 402 comprises a grating-like structure of vertical slits, and the resulting diffraction pattern 406 extends primarily in a horizontal direction. The pOLED display 404 comprises a pentile structure and the diffraction pattern 408 extends in vertical and horizontal directions.

Figure 5:
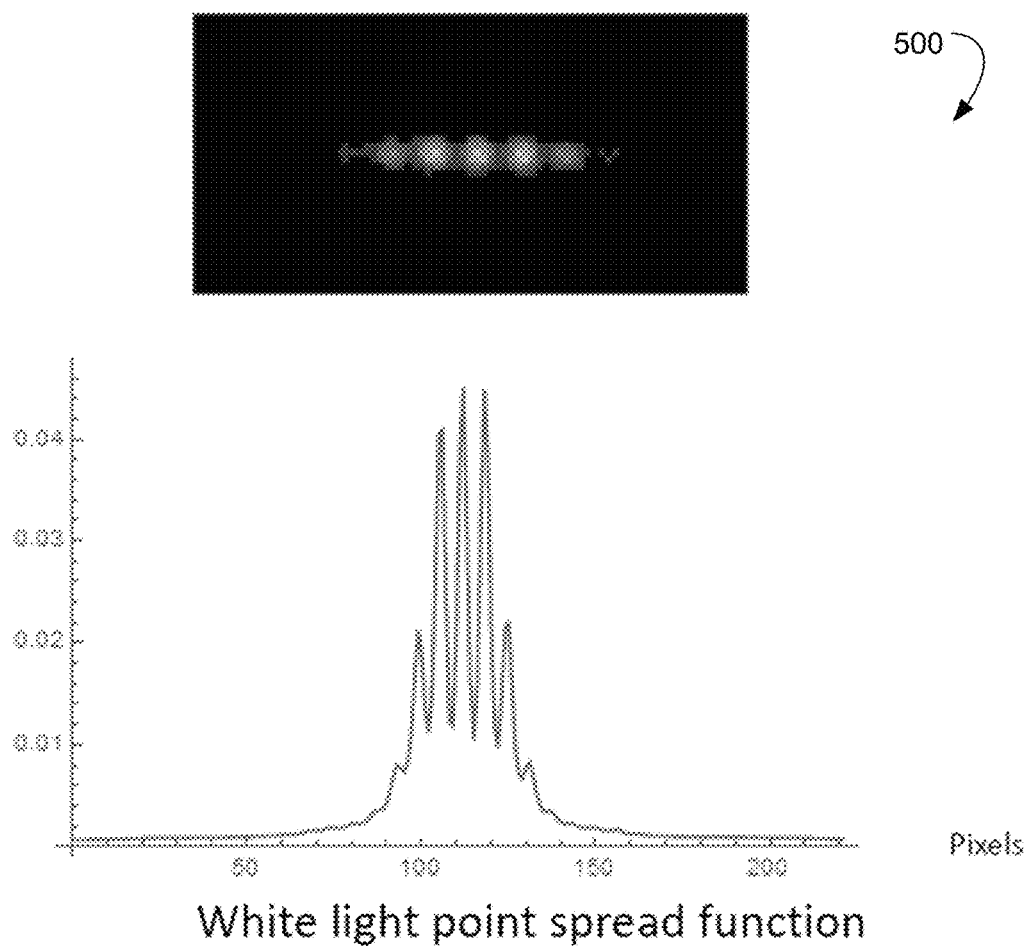
FIG. 5 shows a point spread function for white light for a tOLED display comprising slits in pixels for through-display imaging.
Figure 6:
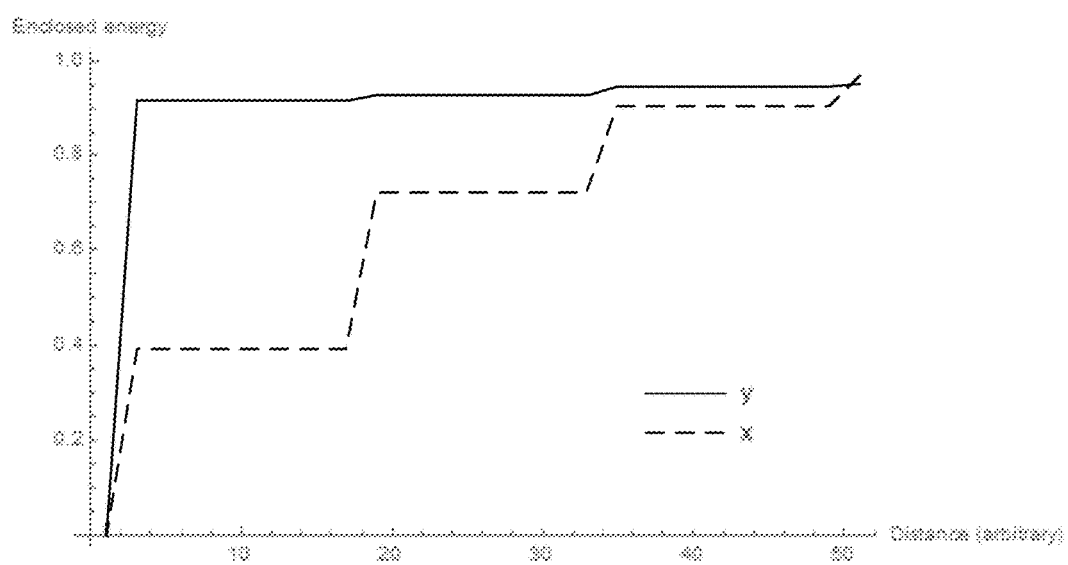
FIG. 6 shows a plot of enclosed energy in the x and y directions as a function of arbitrary distance for an example tOLED display.

FIG. 5 shows an example white light PSF 500 for a camera positioned behind an example tOLED display having vertically oriented slits in pixels, such that the tOLED display functions as a mask in the optical path. The white light PSF 500 shows a spread over approximately 100 pixels in the x-direction (horizontal), which may be due to the grating-like nature of the mask. FIG. 6 shows a plot of the enclosed energy in the x and y directions as a function of arbitrary distance for an optical system comprising the example tOLED display in the optical path.

Figure 7:
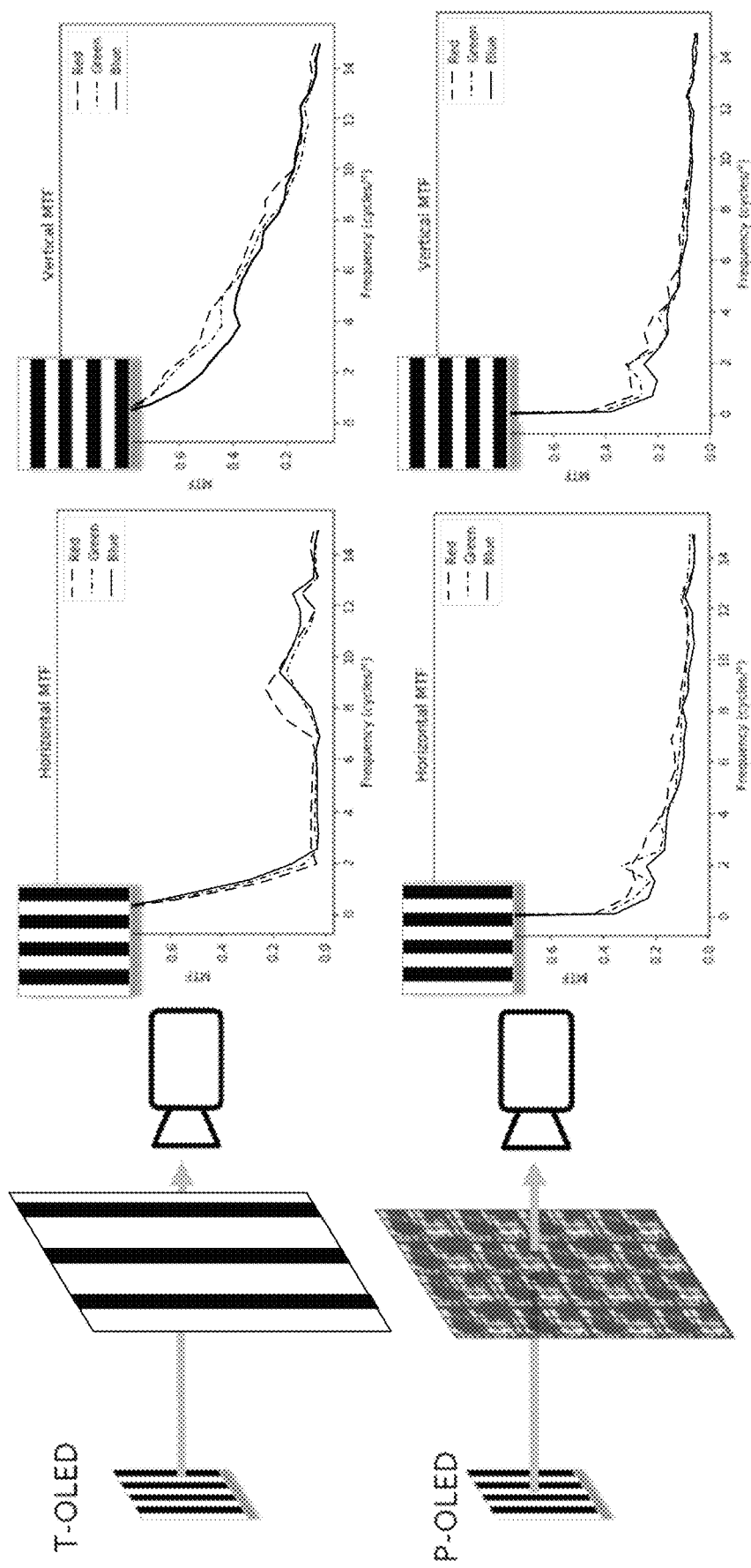
FIG. 7 shows modulation transfer function (MTF) characteristics for example tOLED and pOLED displays.

Combined degradation effects caused by through-display imaging through each of a tOLED display and a pOLED display were further characterized by plotting the modulation transfer function (MTF) for each of an optical system comprising an example tOLED display and an optical system comprising an example pOLED display. FIG. 7 shows MTF characteristics obtained by displaying a periodic sinusoidal pattern to the imaging system comprising the tOLED display and the imaging system comprising the pOLED display. Each MTF shows the influences of diffraction on image contrast. For each display type studied, the measured MTF takes into account the effect of finite lens aperture, lens performance, finite pixel size, noise, non-linearities, and quantization (spatial and bit depth). As shown in FIG. 7, for the tOLED display, contrasts along the horizontal direction were mostly lost for some spatial frequencies. For pOLED, the contrast levels degraded when compared to a display-free camera, but did not reach zero for mid-frequency pattern. The plotting shown in FIG. 7 is consistent with the diffraction patterns revealed by the PSFs.

Figure 8:
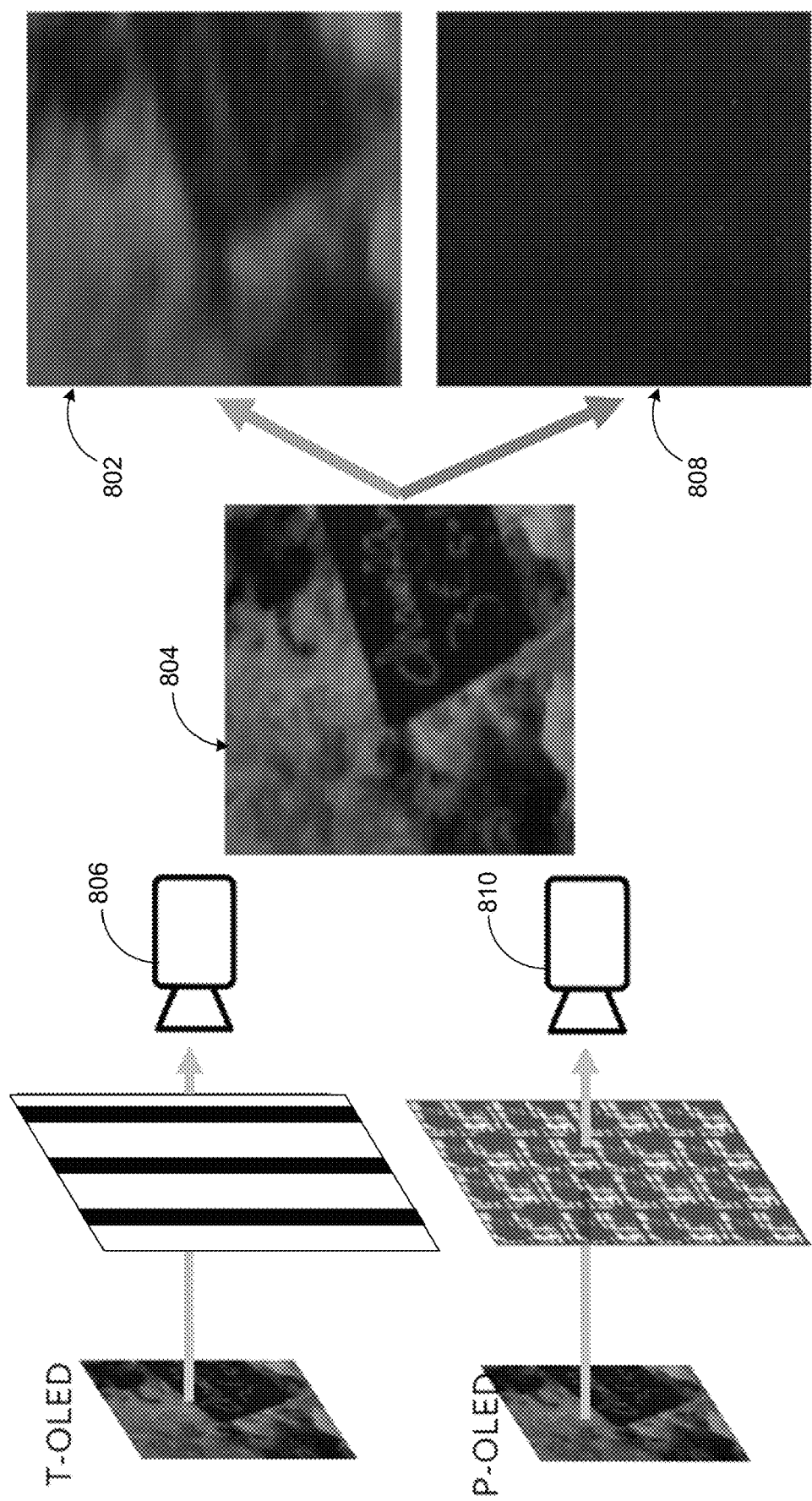
FIG. 8 shows an example image of a real scene captured by a camera positioned behind an example tOLED display and an example image of the real scene captured by a camera positioned behind an example pOLED display.

FIG. 8 shows a first image 802 of a real scene 804 as captured by a camera 806 looking through an example tOLED display having vertically oriented slits in pixels, and shows a second image 808 of the real scene 804 as captured by a camera 810 looking through an example pOLED display. The first image 802 is degraded by blur and noise, among other potential factors. The second image 808 is degraded by low light, color transform, high noise, and blur, among other potential factors. Neither image 802, 808 plausibly portrays the real scene 804.

Figure 9:
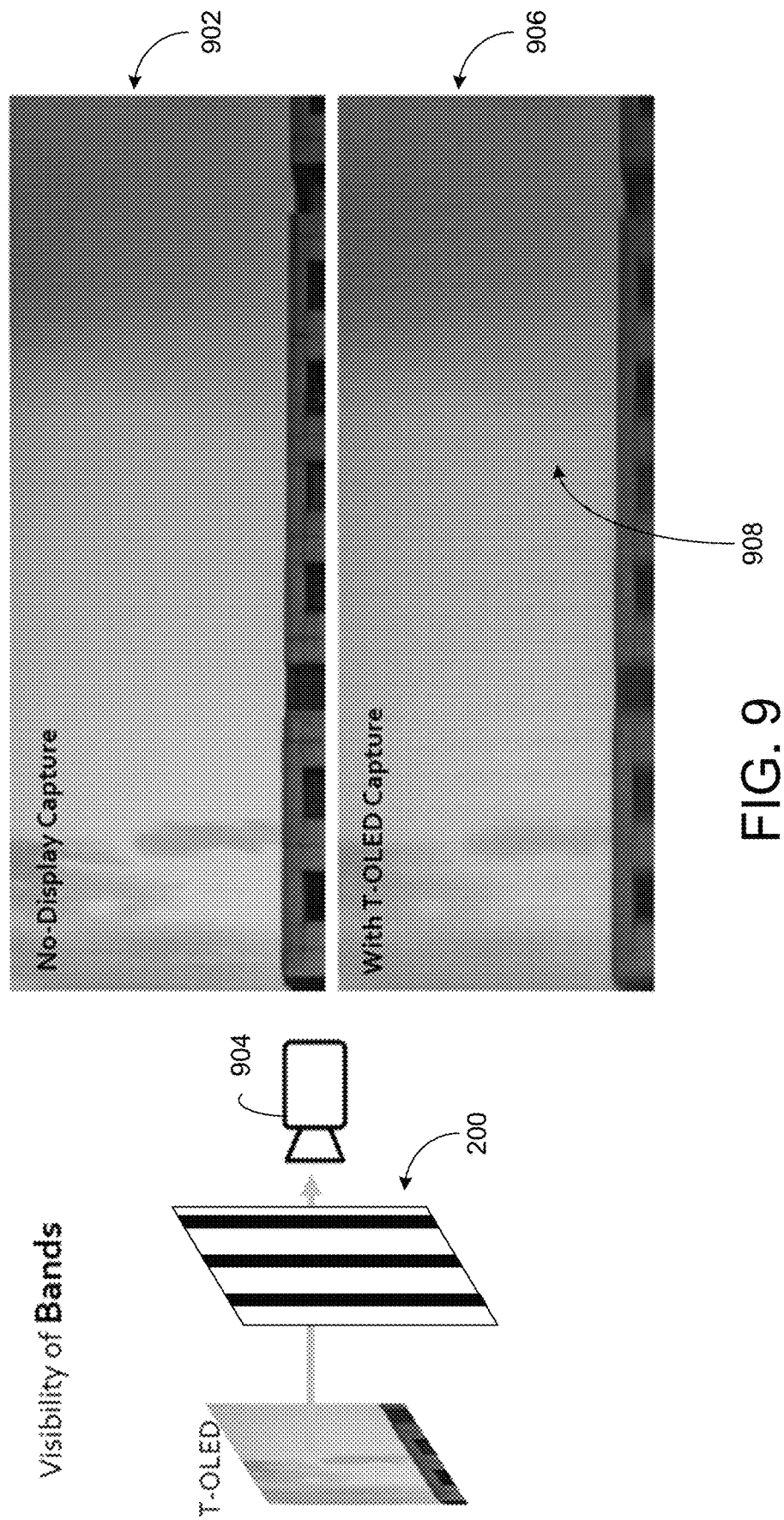
FIG. 9 shows an example of banding in an image captured by a camera positioned behind a tOLED display caused by a pixel structure of the display.

Various other sources of degradation may affect images captured from behind a display panel. FIG. 9 depicts a first image 902 of a real-world environment that was captured by a camera 904 without a display panel disposed between the camera lens and the real-world background, and a second image 906 that was captured by the camera 904 positioned behind an example tOLED display having vertically oriented slits in pixels. Bands (one of which is shown at 908) resembling the vertical stripe pixel layout of the tOLED display are visually perceptible in the second image 906.

A degradation pipeline may be used to model the combined degradation effects on an image captured via a behind-display camera. Given a degradation-free image x, a degraded observation y may be formulated according to Equation (1), where β is the light transmission rate, k is the point spread function, and n is noise.

$$y=[(\beta x)\otimes k]+n \qquad \text{Equation (1)}$$

The image restoration techniques described herein utilize machine-learned methods to restore images captured via a behind-display camera. Prior to deploying and implementing an image restoration machine learning model (e.g. in a live imaging context), the image restoration machine learning model is trained via input of training data comprising undegraded/degraded image pairs, where each undegraded/degraded image pair comprises an undegraded image and a degraded image that represents an appearance of the undegraded image to a behind-display camera.

Figure 10:
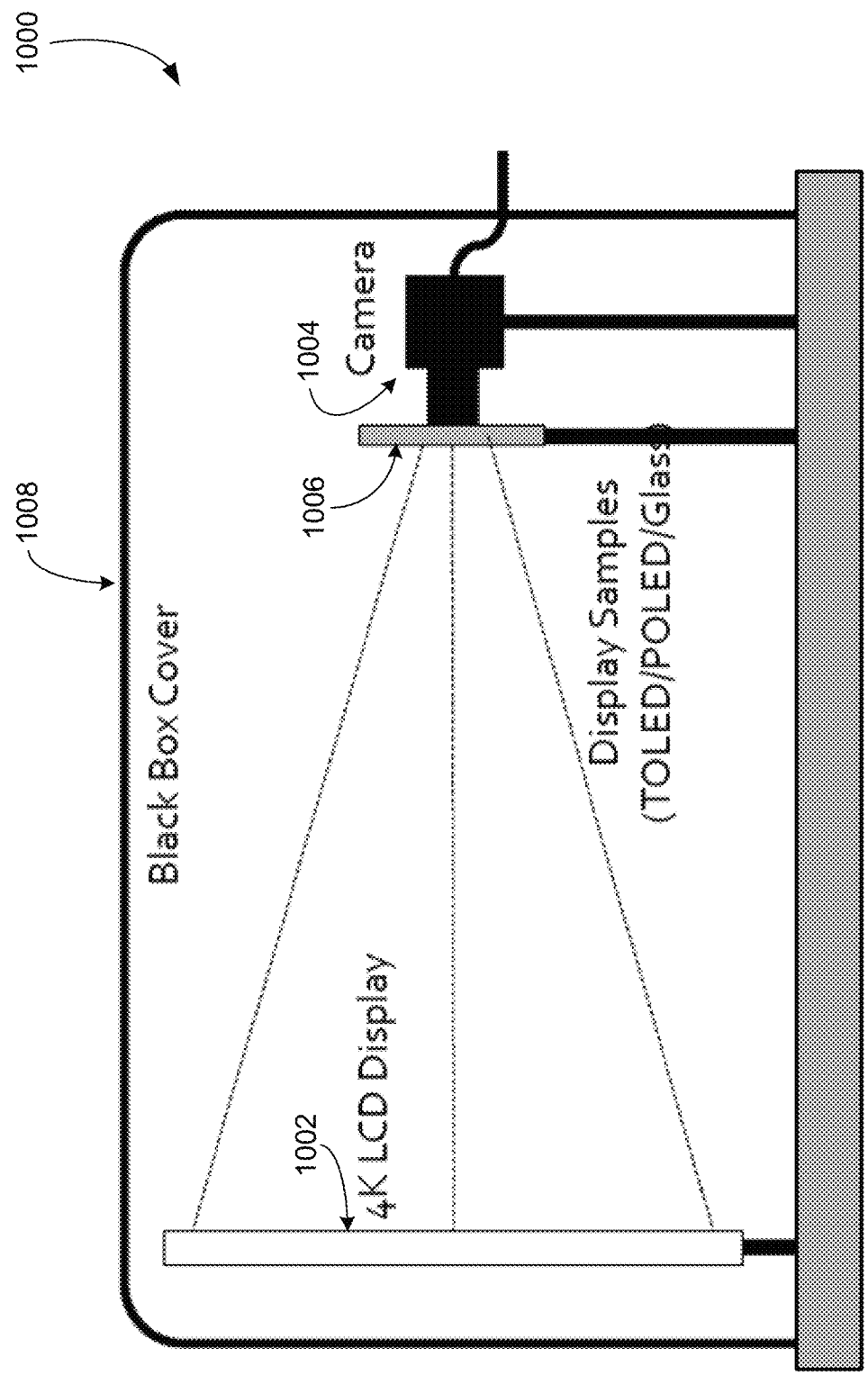
FIG. 10 schematically shows an example data acquisition pipeline for generating degraded/undegraded image pairs for training an image restoration machine learning model.

FIG. 10 shows aspects of an example data acquisition pipeline 1000 for generating training data comprising undegraded images and degraded images. The data acquisition pipeline 1000 includes a display device 1002, a camera 1004 positioned a predetermined distance from the display device 1002, and a display sample 1006 disposed in the optical path between the camera 1004 and the display 1002. The camera 1004 in this example is positioned at a centerline of the display device 1002 and oriented/adjusted to capture images of the display device 1002, but may have any other suitable position in other examples. The distance between the camera 1004 and the display device 1002 is selected such that the camera 1004 images the full monitor range of the display device 1002. In some examples, the data acquisition pipeline also may include a black box cover 1008 surrounding the display device 1002, camera 1004, and display sample 1006, which may help to prevent light of sources other than the display device 1002 from reaching the camera aperture.

The display device 1002 is configured to display images at a suitably high-resolution. For example, the display device 1002 may comprise a 4K LCD or other ultra-high definition (UHD) monitor or television. In other examples, the display device may have any other suitable resolution. In some examples, during data collection, a standard red, green, blue (sRGB) color space of the display device 1002 may be set such that the true color shown on the display device 1002 follows a gamma curve with approximately γ=2.2. In this manner, the sRGB color shown on the display device 1002 may be mapped back to the irradiance of the original images using an sRGB transfer function.

The camera 1004 comprises a visible light (RGB or grayscale) machine vision camera. In one experiment, the camera 1004 comprised a 2K RGB machine vision camera, but may be any other suitable camera in other examples. Any suitable images may be selected for display in the data acquisition pipeline 1000 for image capture via the camera 1004. Suitable images include images comprising visual information from within a frequency band (e.g., $F_0$ in the Fourier transform of the image) that would be degraded or lost due to diffraction from the display sample 1006. As examples, photographs of buildings, people, and/or landscapes may be suitable for inclusion in the data acquisition pipeline 1000, as such images comprise medium-frequency information that would be lost due to diffraction.

In some examples, the data acquisition pipeline 1000 may utilize synthetic images having pseudo-random patterns of black and white lines, which may help to provide the image restoration machine learning model with isolated examples of sharp lines/edges. In one specific example, images from the DIV2K dataset (E. Agustsson and R. Timofte. Ntire 2017 challenge on single image super-resolution: Dataset and study. *Proceedings of the IEEE Conference on Computer Vision and Pattern Recognition Workshops*, pages 126-135, 2017) may be used as training images.

To obtain a collection of undegraded images for the training dataset, the camera 1004 captures images displayed on the display device 1002. The data acquisition pipeline 1000 may simulate a real-time video system. In one specific example, a frame rate of the camera 1004 is set to 8 frames per second (fps) and a maximum shutter speed of 125 milliseconds (ms), which may help to capture images having a suitably high SNR. In another example, multiple images may be acquired of each image displayed on the display device, and the multiple images may be averaged to obtain undegraded images. Prior to image acquisition, the camera 1004 may be calibrated (e.g. by measuring a full-screen white image and a full-screen black image displayed via the display device 1002, respectively, to set white and black levels).

In some examples, the undegraded images are captured while no display sample 1006 is positioned in the optical path between the camera 1004 and the display device 1002. In other examples, undegraded images are captured while a display sample 1006 comprising an optically transparent plate is positioned in the optical path. The use of the display panel comprising the optically transparent plate may act as a proxy for a total thickness of the display and cover glass. As such, when included, the optically transparent plate may comprise a same thickness as a display sample(s) used for degraded image acquisition. Further, in some examples, computing and saving the average of a plurality (e.g., 10-20) of repeated captured frames may help to form a raw, undegraded image and reduce or eliminate image noises in the undegraded image set.

To obtain a collection of degraded images for the training dataset, the camera 1004 captures the same plurality of images of the display device 1002, but the display sample 1006 positioned in the optical path comprises a display panel (tOLED, pOLED, etc.) or a mask based upon a display panel design, and the specific gain value is adjusted. This training data generation procedure creates a 1-1 correspondence between undegraded and degraded images without having to rescale, crop, or otherwise process the images acquired, which may result in a simpler machine-learning model that is amenable to lightweight hardware implementations.

As mentioned above, the specific gain value is set for degraded image acquisition. In an example, for images acquired through a tOLED display having vertically oriented slits in pixels, the gain value may be calibrated to 16 dB to match the intensity range of the undegraded images. The collected undegraded/degraded pairs are naturally well aligned spatially in pixel-level. In some examples, the data for training may be further normalized or warped, e.g. to make a point spread function relatively consistent over an entire image and thereby help to simplify an image restoration machine learning model. In other examples, further normalization and/or warping may be omitted. For images acquired through a pOLED display, because of the color substrate of the pOLED, some lights may be filtered out and break out the white balance. In some examples, the original intensity level of the images is maintained without re-adjusting the white balance. As the light transmission rate for the pOLED display may be low (~2.9%), the gain value may be set to, or close to, a maximum of the camera (e.g. 25 dB), to obtain higher signal values.

Figure 11:
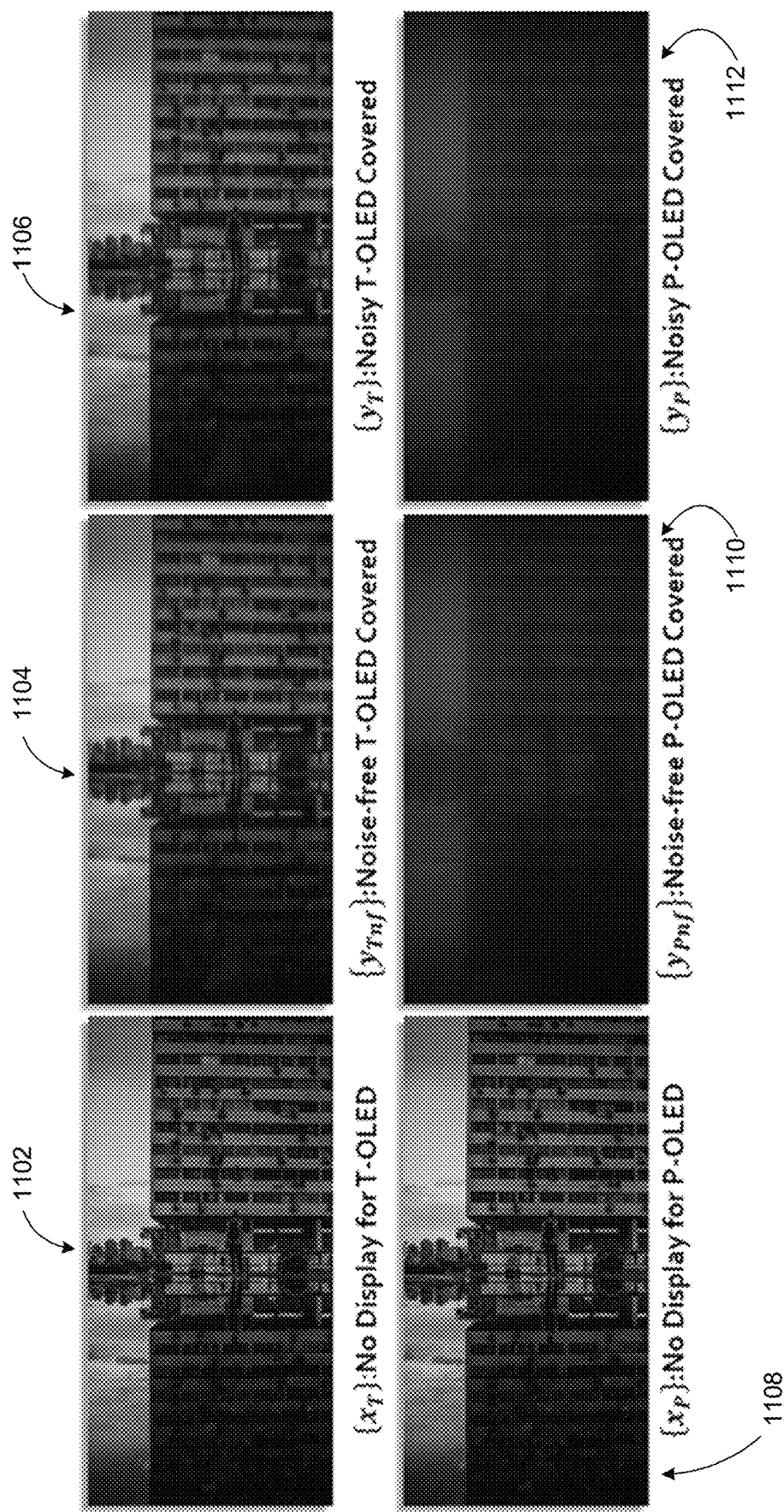
FIG. 11 shows images from an example dataset for training an image restoration machine learning model.

In some examples, the data acquisition pipeline 1000 obtains a third set of training data images—noise-free degraded images. Noise-free degraded images may be formed by, during degraded image acquisition, averaging a plurality (e.g., 10-20) of repeated captures. Further, in some examples, obtaining each set of training data images (undegraded, degraded, and optionally noise-free degraded) may comprise recording both 16-bit raw sensor data and 8-bit sRGB data after camera processing. FIG. 11 depicts examples of training data collected using the data acquisition pipeline 1000 of FIG. 10. The training data for tOLED degradation includes an undegraded image 1102, a noise-free degraded image 1104, and a noisy degraded image 1106. The training data for pOLED degradation likewise includes an undegraded image 1108, a noise-free degraded image 1110, and a noisy degraded image 1112.

In some examples, training data may be generated using computerized models of image degradation, in addition or alternatively to manually generating training data via the data acquisition pipeline 1000. Computerized generation of training data may help to build larger training datasets in less time compared to manual training data acquisition. Further, such methods may help to generalize the image restoration machine learning model to a variety of different display (and thus degradation) types.

As mentioned above, training image data comprising degraded and undegraded image pairs are input as training data into the image restoration machine learning model to train the image restoration machine learning model. For example, the image restoration machine learning model may be trained to identify one or more missing frequencies in the frequency domain and generate frequency information to "fill in" the missing frequency information (e.g. perform texture analysis, edge detection, style transfer, etc.). When restoring an image for video conferencing, the restored image does not necessarily need to be a scientifically accurate image for the human eye to perceive it as a plausible image.

Figure 12:
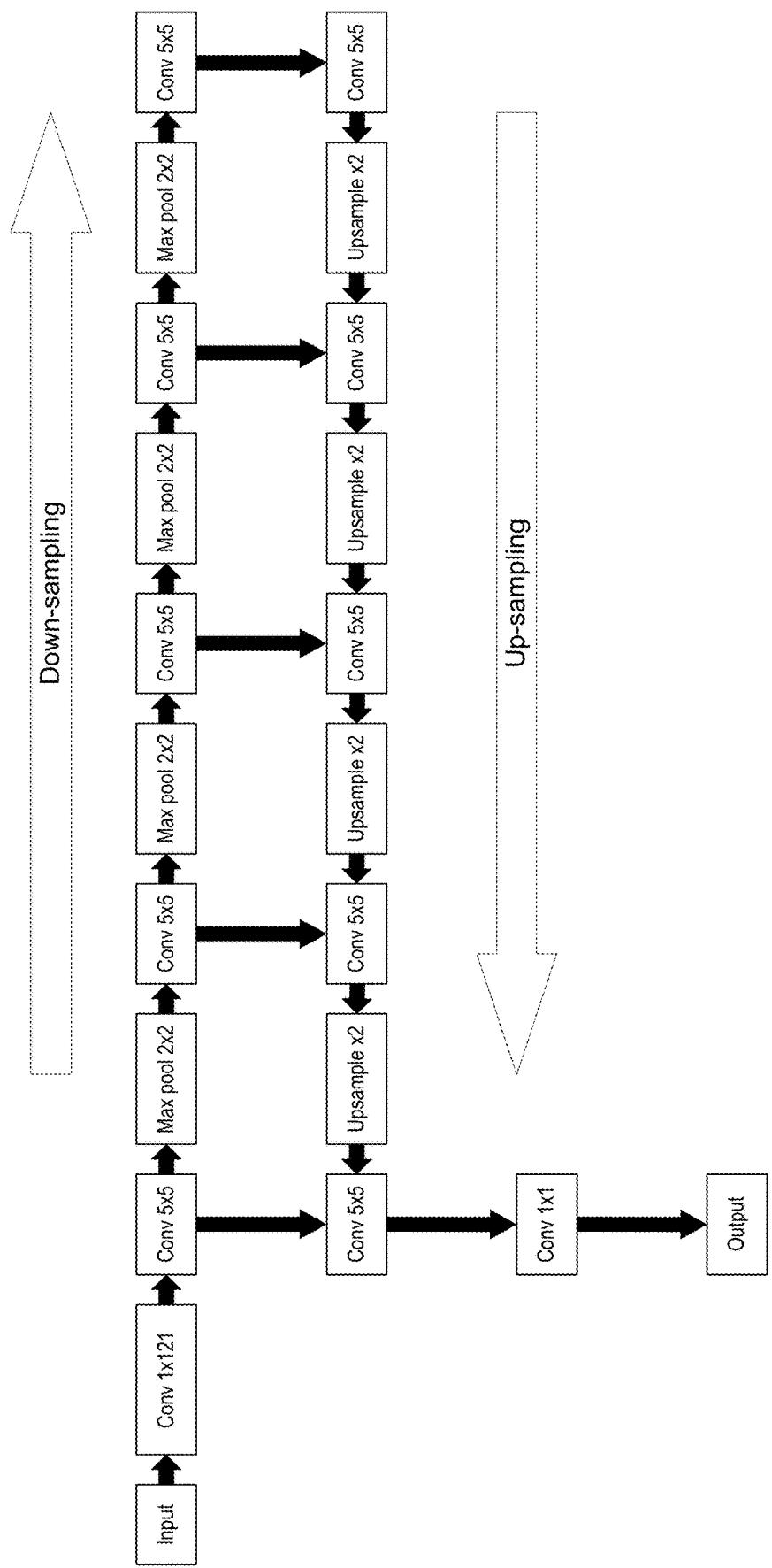
FIG. 12 is a block diagram illustrating an example architecture of an image restoration machine learning model in the form of a convolutional neural network (CNN).

In some examples, the image restoration machine learning model comprises a neural network, which is flexible and may combine various aspects of algorithms into a shared framework. FIG. 12 depicts an example image restoration machine learning model in the form of a neural network 1200 configured to restore images degraded due to through-tOLED imaging. The neural network 1200 is a multiscale convolutional network comprising a pre-computed regularized one-dimensional kernel. As mentioned above with reference to FIG. 5, the PSF for an optical system comprising the example tOLED display positioned between the camera and an image scene is approximately 100 pixels. The blur in an image captured by the optical system may be larger in scale than features in the image, as the blur arises from a slit pattern of the tOLED display positioned between the camera and the real-world scene. To deblur the image, the neural network may utilize a kernel size larger than the PSF. Degraded training data images may also be pre-processed such that the PSF is relatively consistent over the field. In the example of FIG. 12, the neural network 1200 comprises a one-dimensional deconvolution kernel (1×121) based at least on the slit shape and size of the tOLED pixels. While described with reference to image degradation caused by the tOLED display 200 of FIG. 2, the neural network 1200 may similarly be used to restore images degraded by the presence of a different type of display positioned in the optical path. A differently configured kernel may be selected for a display comprising different diffraction behavior than a tOLED having vertically oriented slits in pixels.

The neural network 1200 further comprises convolution shapes trained to perform aspects of image restoration (deblurring, denoising, and optionally dehazing and/or color mapping).

Image data comprising at least pairs of degraded images and undegraded images are input as training data for training the neural network. Provided a degraded image that, in the frequency domain, is missing a frequency band centered on $F_0$, and without wishing to be bound by theory, training of the neural network may configure the neural network to identify a presence of harmonic frequencies (e.g., $$\frac{F_0}{2}, \frac{3F_0}{2}, 2F_0,$$

or other frequencies centered around multiples or submultiples of $F_0$, such as $$\frac{mF_0}{n}$$

where m and n are integers), infer that $F_0$ is a missing frequency in the degraded image based on the harmonics identified, and reconstruct the image to include the missing frequency $F_0$. Where the neural network is configured spatially rather than in frequency space, the recovery functionality may be implemented via spatial filters followed by non-linear operations, along with sub-sampling and super-sampling of the images at the various stages of the neural network. Further, in some examples, the network may, through training, synthesize image detail in regions of the degraded image where the network would expect such details to exist in the undegraded image.

Figure 13:
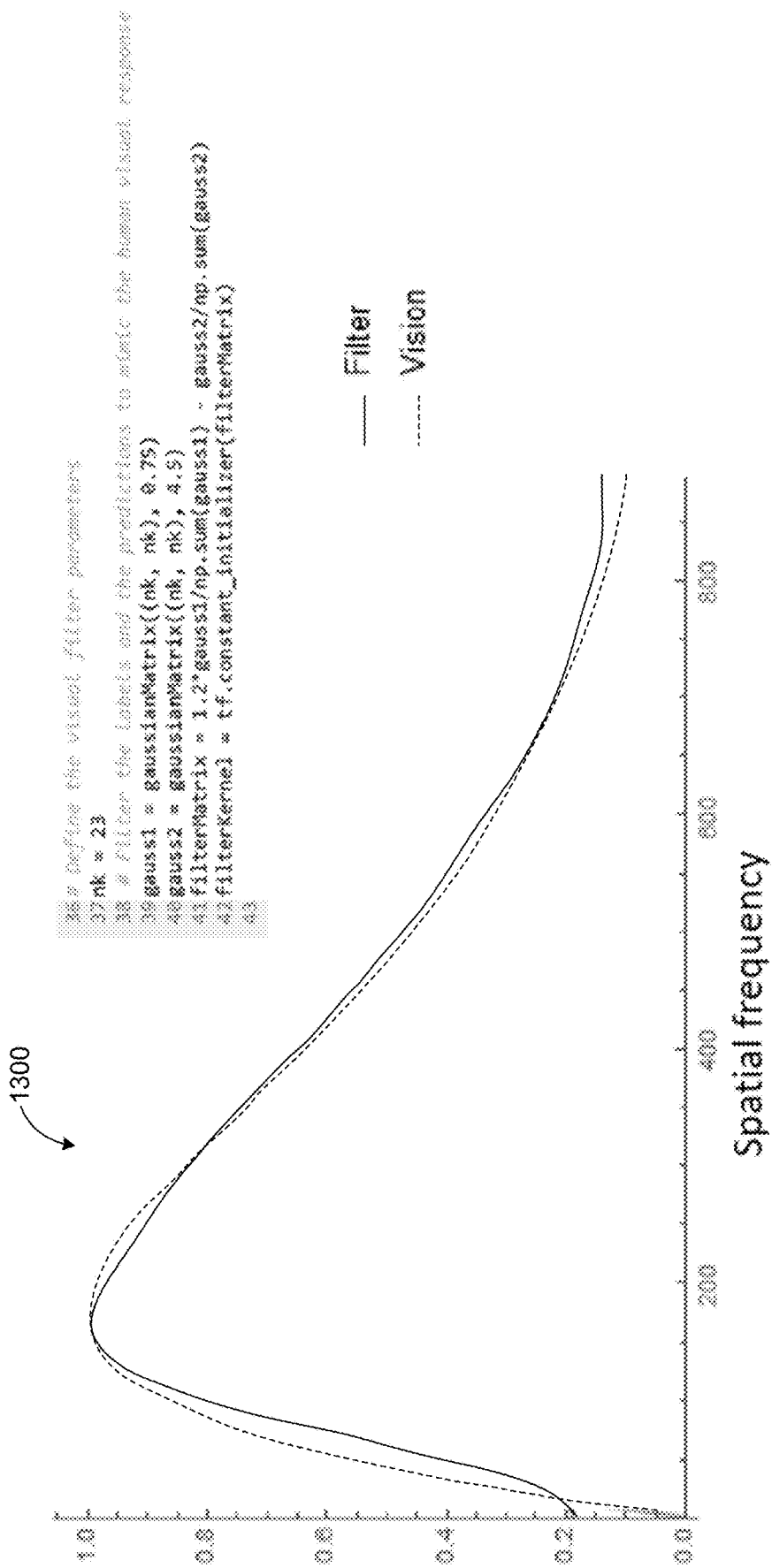
FIG. 13 shows a plot of an example loss function for the image restoration machine learning model of FIG. 12.

FIG. 13 depicts a plot of an example loss function 1300 for the neural network 1200 of FIG. 12. The depicted loss function is a combination of least absolute deviations (L1) loss and texture loss, which is broadly a cross-correlation of difference between patches of the images. In some examples, the loss function may additionally or alternatively include lease square errors (L2) loss. Prior to computing the loss, the output of the neural network 1200 was passed through a filter to emulate the human visual response. In other examples, the output of the neural network 1200 may be passed through one or more layers of another pre-trained network (e.g., VGG-19, of Simonyan, K., and Zisserman, A., "Very Deep Convolutional Networks for Large-Scale Image Recognition" *International Conference on Learning Representations,* 2015, made publicly available by Oxford University, UK, http://www.robots.ox.ac.uk/~vgg/research/very_deep/) before computing the loss, which may also help to provide human vision emulation.

Figure 14:
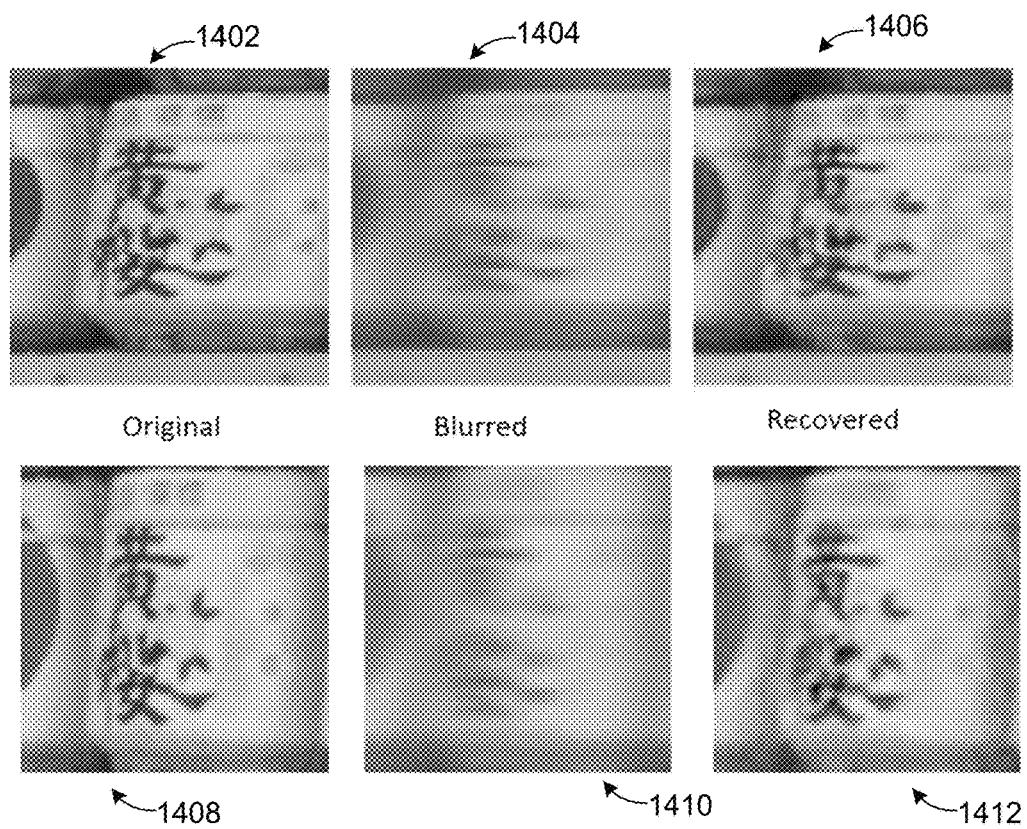
FIG. 14 shows example images restored by using the image restoration machine learning model of FIG. 12 for monochrome and RGB images.
Figure 15:
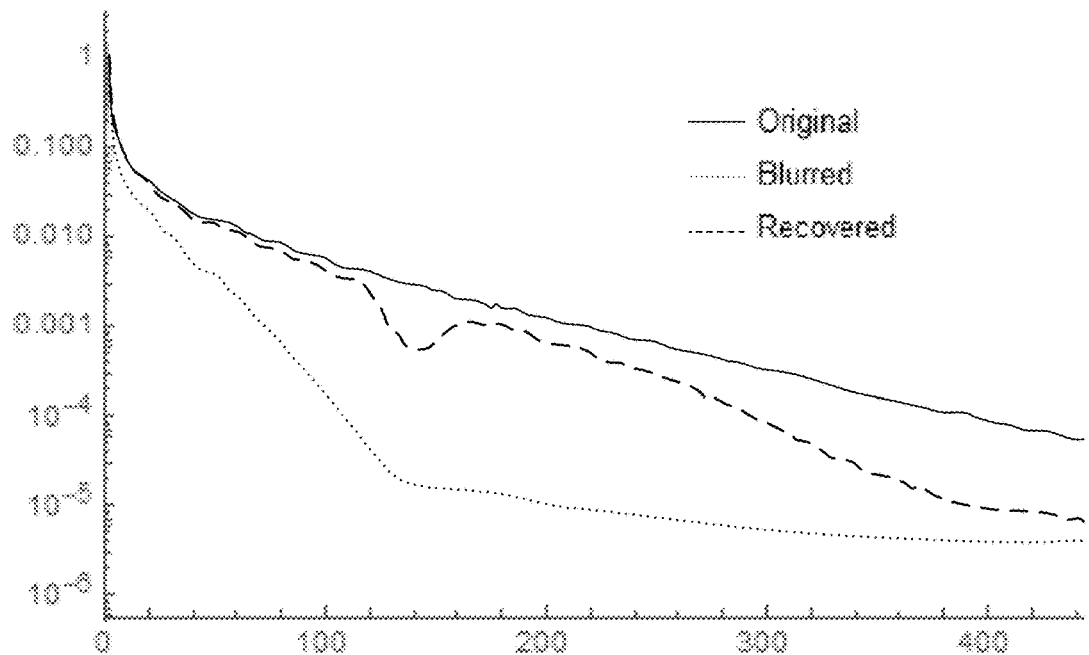
FIG. 15 shows the averaged amplitude spectra of monochrome images restored via the CNN of FIG. 12.

FIGS. 14-15 depict experimental image restoration results obtained using the neural network 1200 of FIG. 12. In this example, monochrome image 1402 is an image of a real-world scene captured via a camera unobstructed by a display, monochrome image 1404 is a degraded image captured via a camera positioned behind a tOLED display with respect to the real-world scene, and monochrome image 1406 is a restored image output by the neural network 1200 in response to input of the degraded image 1404. Averaged amplitude spectra of each image are shown in FIG. 15.

The image restoration machine learning model may recover an RGB image using a similar network architecture to the neural network used for monochrome images, as indicated by the example original RGB image 1408, degraded RGB image 1410, and restored RGB image 1412 shown in FIG. 14. Input color images may be noisier and include more artifacts than monochrome images.

Figure 16A:
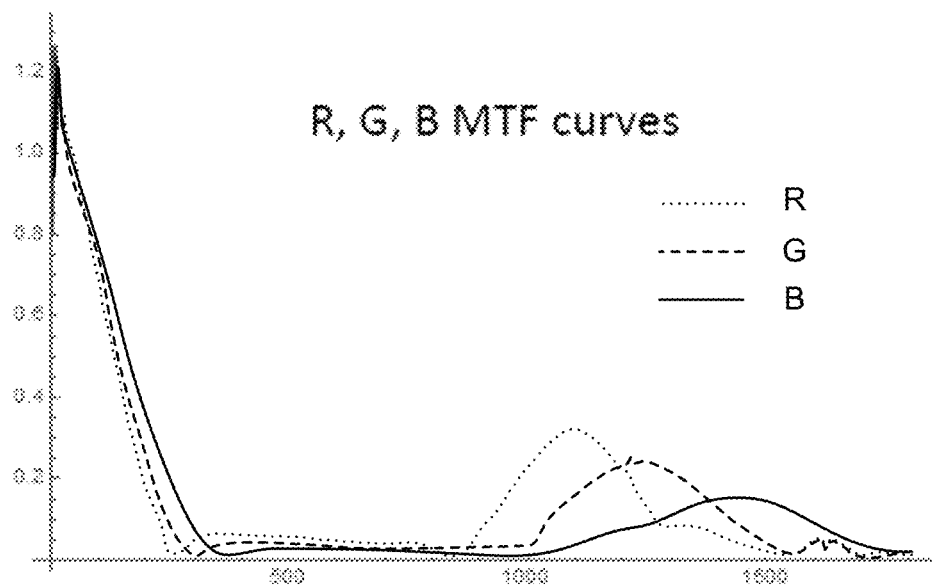
FIGS. 16A-16B show MTF curves obtained by illuminating an example tOLED display with visible and IR wavelengths.
Figure 16B:
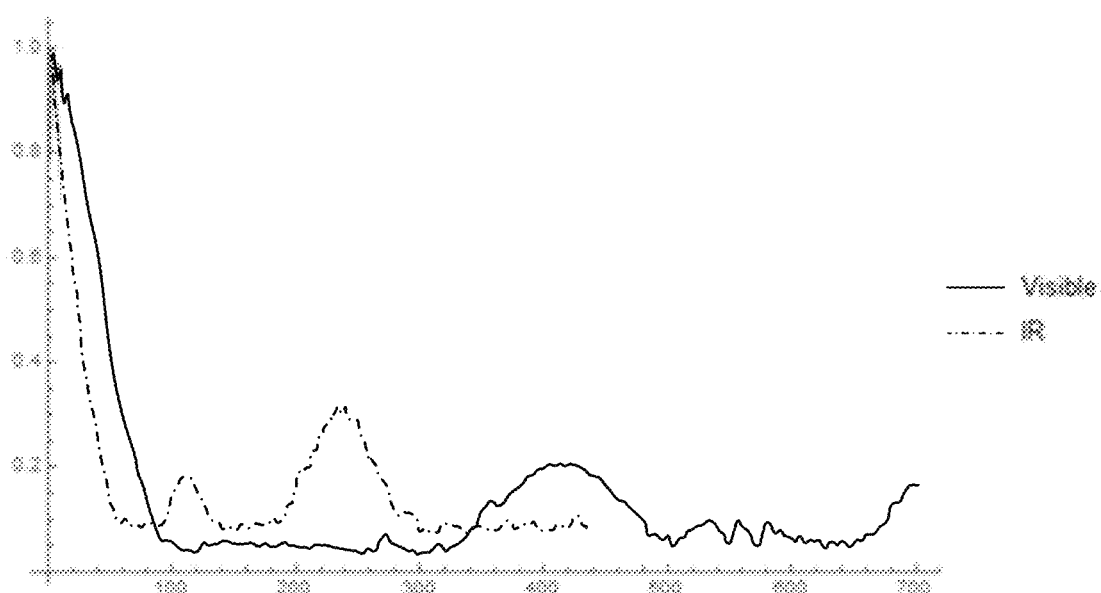

In some examples, spatial frequency response for a behind-display imaging system may be improved by illuminating the behind-display imaging system with other wavelengths of light, in addition to visible light. FIG. 16A depicts the MTF curves of red, green, and blue wavelength bands of visible light for a behind-display imaging system comprising an example tOLED display having vertically oriented slits in pixels. The MTF is diffraction-limited and scales with wavelength. Adding wavelengths of infrared (IR) light may at least partially "fill in" missing portions of the MTF visible light curve, as shown in FIG. 16B.

In a convolutional neural network, pixel nodes at a level in the network are not fully connected to those of an adjacent level, but rather are connected to spatially proximate pixel nodes. Matching the deconvolution kernel at least to the spread of the point-spread function followed by a relatively lightweight series of convolutions (e.g., to perform denoising), as shown in the example of FIG. 12, may achieve acceptable output images at video frame rates and with relatively low network complexity. This may provide for a relatively lightweight framework from a compute and memory usage standpoint, and thereby may allow real-time processing or near-real-time processing on a video stream. However, the smaller receptive field for such a neural network may not react to longer range features in images. As one possible solution, a fully connected network may be used, in which every pixel in the output image is connected to every pixel in the input image. While the image restoration provided by such a network may be superior to convolutional networks with a smaller receptive field, the memory and compute requirements are much higher.

Thus, a machine learning model may be configured to look at more scale lengths in an input image, without creating an unduly large kernel, by looking at downsampled versions of the input image alongside a full resolution version of the image. As one example architecture, a u-shaped neural network may allow for a larger receptive field than a convolutional neural network while being less memory and compute-intensive than a fully connected network.

Figure 17:
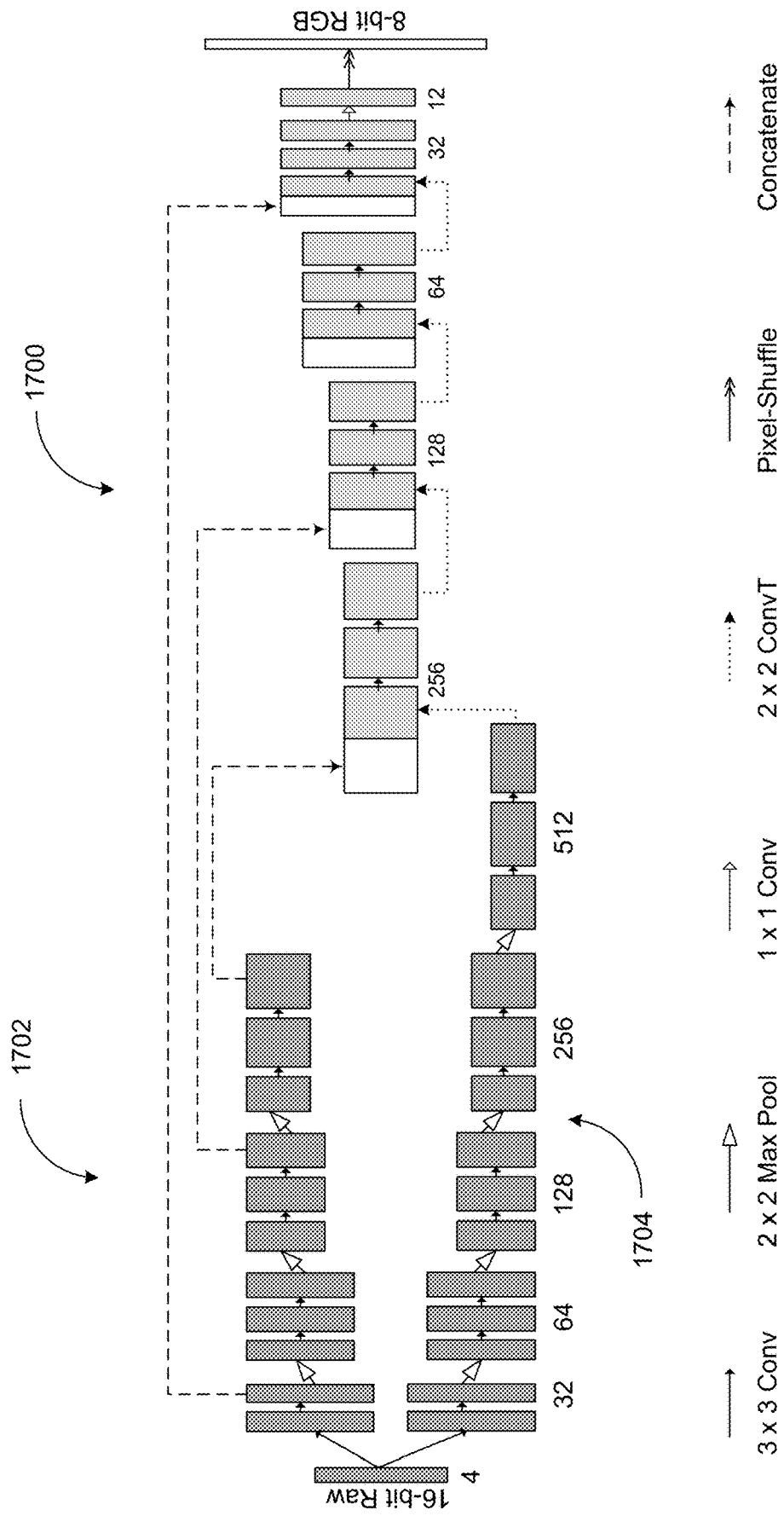
FIG. 17 is a block diagram illustrating another example architecture of an image restoration machine learning model in the form of a U-shaped neural network.

FIG. 17 is a block diagram illustrating an example u-shaped neural network 1700 suitable for use as the image restoration machine learning model. The u-shaped neural network 1700 is configured to progressively reduce resolution of an input image, which allows the u-shaped network to look at a larger receptive field of the input image. Further, the u-shaped neural network 1700 is configured to preserve high frequency information in the image at each downsampling/extraction stage. This preserved feature information is used in the upsampling process, such that the u-shaped neural network 1700 outputs an image comprising a same size (resolution) as the input image without loss of high-frequency information. In contrast, a downsampling path of a convolutional neural network discards high frequency information.

The u-shaped neural network 1700 comprises two sub-encoders (as opposed to the single encoder in existing UNet architectures). One sub-encoder 1702 computes residual details to add, and the other sub-encoder 1704 learns content encoding from degraded images. By splitting the encoder into two (or more) sub-encoders, the u-shaped neural network 1700 may have fewer parameters compared with doubling the width of each layer and may more efficiently infer and learn compared to a single encoder network.

The u-shaped neural network 1700 is configured to receive input of a four-channel raw sensor data observation y and to output a restored three-channel image x. Training the u-shaped neural network 1700 from paired undegraded/degraded images comprises applying the L1 loss from image reconstruction to the model $\mathcal{F}(y; \theta)$. The objective function may be represented according to Equation (2), where $\theta$ is the learnable parameters of the network, $\mathcal{F}$ represents the network, $y_i$ is the observation of degraded images, $x_i$ is the ground-truth undegraded image, and N is the total number of images inside a training batch. In some examples, training the u-shaped neural network also comprises applying SSIM and perception loss (VGG Loss) for an ablation study (which examines the functions of selected components in a neural network by replacing or removing such components and observing performance changes of the network 1700).

$$\mathcal{L}_1(\theta) = \frac{1}{N}\sum_{i=1}^{N} \|\mathcal{F}(y_i; \theta) - x_i\| \qquad \text{Equation (2)}$$

One example learning method for the example u-shaped neural network comprises splitting a training dataset into a training partition and a validation and testing partition prior to inputting training data into the u-shaped neural network 1700. The images in the training partition are augmented using raw image augmentation (e.g., as described by J. Liu, C.-H. Wu, Y. Wang, Q. Xu, Y. Zhou, H. Huang, C. Wang, S. Cai, Y. Ding, H. Fan, et al., Learning Raw Image Denoising with Bayer Pattern Unification and Bayer Preserving Augmentation. *Proceedings of the IEEE Conference on Computer Vision and Pattern Recognition Workshops,* 2019) while preserving the Bayer pattern. Training, in this example, further comprises using the Adam optimizer with a learning rate of 1e-4 and a decay factor of 0.5 after 200 epochs and stopping training at epoch 400.

Figure 18:
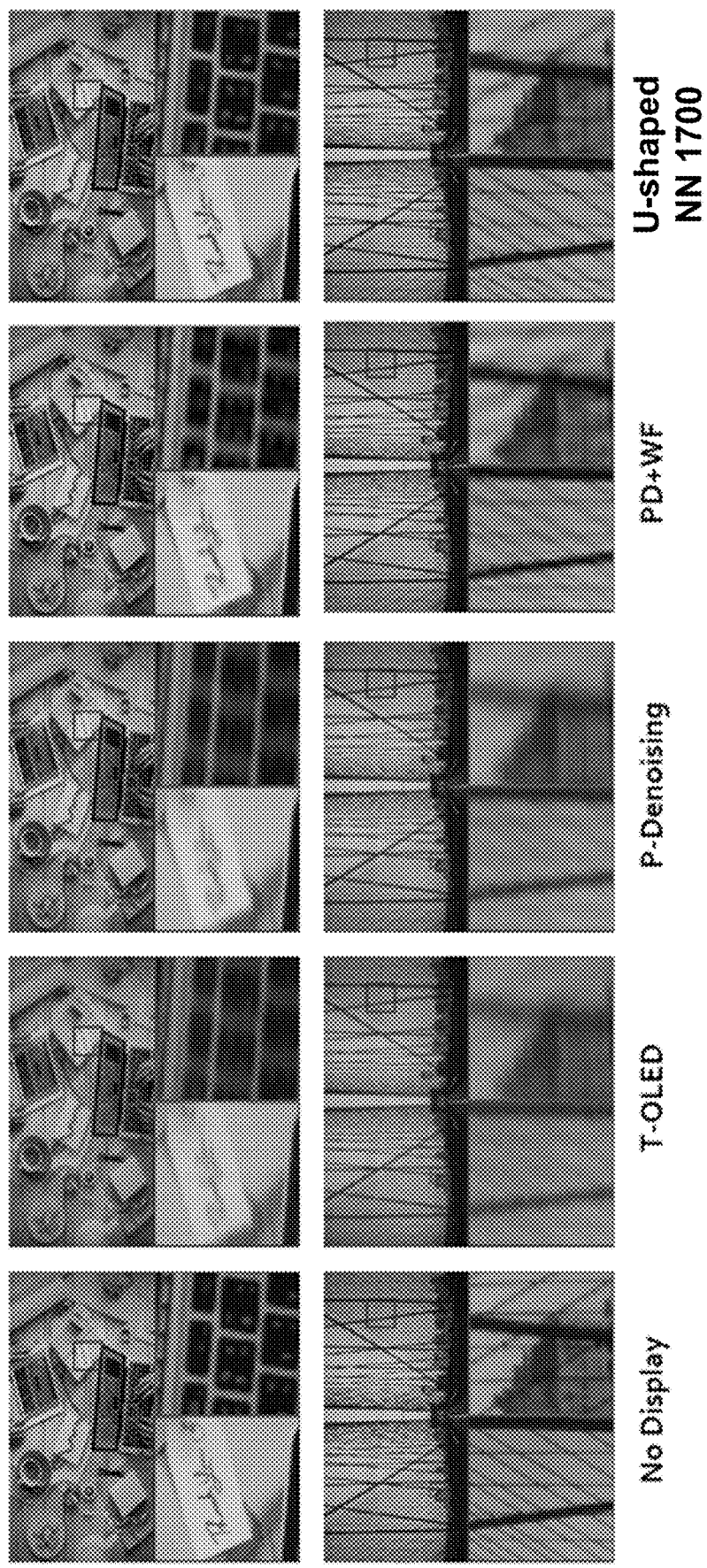
FIG. 18 shows example undegraded images, degraded images captured from behind a tOLED display having vertically oriented slits in pixels, and images restored via the U-shaped neural network of FIG. 17 compared to images restored via other approaches.
Figure 19:
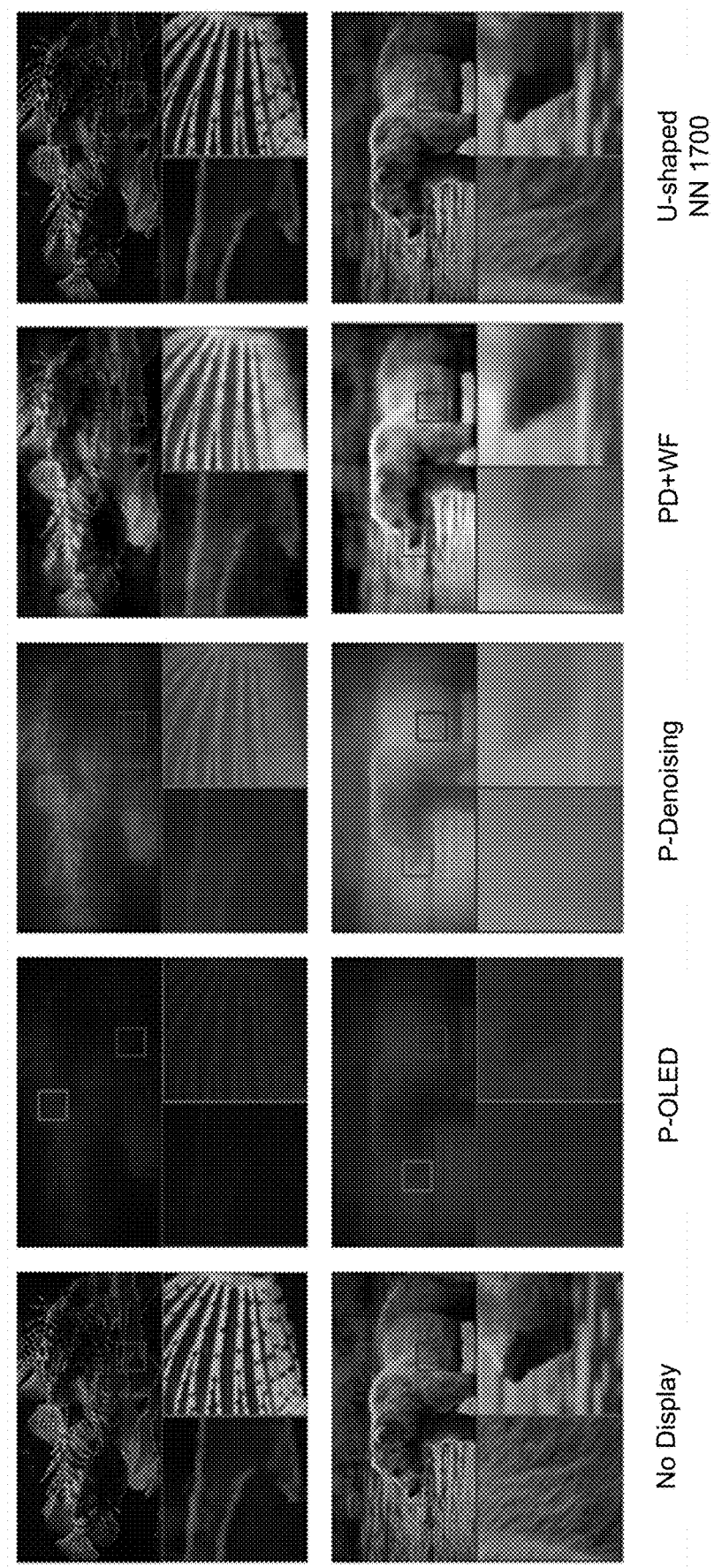
FIG. 19 shows example undegraded images, degraded images captured from behind a pOLED display, and images restored via the U-shaped neural network of FIG. 17 compared to images restored via other approaches.

FIGS. 18 and 19 show restoration results on real paired data for tOLED and pOLED degradation types, respectively, achieved via the u-shaped neural network 1700. Quantitative results are also listed below in Table 2, which compare the network 1700 with a baseline real blind denoising algorithm Pixel-shuffle Downsampling (PD) (described by Y. Zhou, J. Jiao, H. Huang, Y. Wang, J. Wang, H. Shi, and T. Huang, When AWGN-Based Denoiser Meets Real Noises. arXiv preprint arXiv:1904.03485, 2019), and an unsupervised Wiener filter (WF) (described by F. Orieux, J. -F. Giovannelli, and T. Rodet, Bayesian Estimation of Regularization and PSF Parameters for Wiener-Hunt Deconvolution, *JOSA A*, 27(7):1593-1607, 2010) given a pre-computed PSF. The performance of the u-shaped neural network 1700 is reported in peak signal-to-noise ratio (PSNR), structural similarity index (SSIM), learned perceptual image patch similarity (LPIPS) (described by R. Zhang, P. Isola, A. A. Efros, E. Shechtman, and O.Wang, The Unreasonable Effectiveness of Deep Features as a Perceptual Metric, *Proceedings of the IEEE Conference on Computer Vision and Pattern Recognition,* pages 586-595, 2018), and inference time. The u-shaped neural network 1700 directly trained on paired data demonstrated better restoration quality. The results were also compared with another Resnet-based structure for super-resolution, EDSR (described by B. Lim, S. Son, H. Kim, S. Nah, and K. Mu Lee, Enhanced Deep Residual Networks for Single Image Superresolution, *Proceedings of the IEEE Conference on Computer Vision and Pattern Recognition Workshops,* pages 136-144, 2017). Though EDSR achieved a comparable performance to the U-shaped neural network 1700, it required longer inference time.

TABLE 2

Pipeline Comparison

| Pipeline structure | Params↓ | RT (ms/MPixel)↓ | 4K tOLED PSNR/SSIM↓ | LPIPS↓ | pOLED PSNR/SSIM↓ | LPIPS↓ |
|---|---|---|---|---|---|---|
| No process | | | 28.83/0.9016 | 0.3744 | 15.40/0.6681 | 0.7590 |
| PD | | | 29.62/0.9196 | 0.3534 | 18.01/0.6975 | 0.6264 |
| PD + WF | | | 28.50/0.9117 | 0.4219 | 16.97/0.7084 | 0.6306 |
| EDSR-RAW (ResNet) | 1.37M | 92.92 | 36.26/0.9703 | 0.1214 | 27.42/0.9176 | 0.2500 |
| Network 1700-RAW (sUNet) | 8.93M | 21.37 | 36.71/0.9713 | 0.1209 | 30.45/0.9427 | 0.2219 |

An ablation study of the u-shaped neural network 1700 image processing pipeline on loss function and image format was conducted and quantitative results are shown in Table 3, below. Replacing raw data with sRGB data increased inference time and decreased PSNR. Adding SSIM or perception loss increased the perceptive performance. The results also compare the u-shaped neural network 1700 to a different UNet structure, and demonstrate that the u-shaped neural network 1700 comprising separate subencoders have an intermediate parameter size, inference time, and relatively better performance in PSNR.

TABLE 3

Ablation study of image processing pipeline for camera behind 4K tOLED and pOLED.

| Conditions | Params ↓ | RT (ms/MPixel) ↓ | 4K tOLED PSNR/SSIM↓ | LPIPS ↓ | pOLED PSNR/SSIM↓ | LPIPS↓ |
|---|---|---|---|---|---|---|
| U-shaped NN 1900 | 8.93M | 21.37 | 36.71/0.9713 | 0.1209 | 30.45/0.9427 | 0.2219 |
| RAW→RGB | 8.93M | 43.45 | 35.72/0.9672 | 0.1428 | 30.09/0.9377 | 0.2337 |
| Double the width | 31.03M | 40.42 | 37.00/0.9730 | 0.1171 | 30.37/0.9425 | 0.2044 |
| Remove separate encoder | 7.76M | 15.85 | 36.47/0.9704 | 0.1288 | 30.26/0.9387 | 0.2318 |
| L1→L1 + SSIM | 8.93M | 21.37 | 36.69/0.9714 | 0.1246 | 30.37/0.9403 | 0.2131 |
| L1→L1 + VGG | 8.93M | 21.37 | 36.31/0.9711 | 0.1130 | 30.37/0.9403 | 0.2130 |

Accordingly, the disclosed examples provide learning-based methods that may help to restore complicated combined image degradation resulting from through-display imaging. In some examples, an image restoration machine learning model may also be trained to perform tasks other than image restoration. For example, an image restoration machine learning model may be trained to perform recognition/classification tasks in addition to image restoration. In one specific example, image degradation caused by covering a camera with a display panel (e.g. tOLED, pOLED, LCD, etc.) may decrease a recall rate for face detection to as small as zero. After image restoration according to the methods described herein, the recall rate may be recovered to an acceptable level.

Aspects of the image restoration machine learning model may be implemented locally in hardware of a computing device, e.g. as stored instructions executable by a logic subsystem of the computing device, and/or may be located remotely from the computing device (e.g. as a cloud-based service). Examples of computing hardware suitable for implementing the image restoration machine learning model are described below with reference to FIG. 27. In any instance, the image restoration machine learning model (e.g., CNN 1200 or u-shaped NN 1700) may be configured to perform image processing at or near video frame rates during use of a behind-display camera for live video applications. Further, the image restoration machine learning model may optionally utilize frame-to-frame averaging, which may help to improve output image quality.

In the examples described above, neural networks are disclosed performing deblurring and denoising, wherein denoising helps to correct for attenuation of the optical signal arising from the through-display imaging. Some displays may attenuate the optical signal significantly. For example, some pOLED displays may have a transmittance as low as 2.8%. This significantly reduces the optical signal, and hence the signal to noise ratio of the system, which may be as low as one in some indoor environments.

The signal on an image sensor is proportional to the transmittance of the display and optics, the square of the lens numerical aperture (1/(2 f/#)) and the pixel area. Given the screen transmittance, the free parameters for a behind-display camera are the lens numerical aperture and the pixel area. However, the pixel area in a camera is constrained by the field of view of the camera and the available thickness behind the screen to accommodate the camera. Computing devices may have little available interior space in a thickness dimension. For example, mobile devices may have only a few millimeters (e.g. approximately 3.6 mm in one example) of interior space from the rear of the display to the opposite interior surface of the case. In contrast, an image sensor and associated printed circuit board may have a thickness of around 0.5 mm, plus around 50 microns of clearance for tolerance purposes, in some examples. As such, the available total optical track TOTR (distance from first lens surface to image plane) is only 3.05 mm in this illustrative example. The focal length may be approximately TOTR/1.4 or less for f/2.0 or f/1.8 lenses. As increasing the aperture to admit more light (lower f-number) increases the TOTR for a given focal length (e.g. lens elements may be thicker, and/or extra elements may be needed for aberration control), the aperture size is constrained by this dimension. As such, it may be difficult to achieve improved performance by increasing the numerical aperture of a camera. Further, as the field of view of the camera is fixed and the resolution of the output image is also specified, pixel dimensions, and thus the light collecting power of the system, are similarly constrained.

Thus, as mentioned above, a computing device may include an array of cameras to increase a light collecting capability of a behind-display imaging system and thereby achieve higher signal-to-noise ratios without increasing a TOTR of the imaging system (see, e.g. K. Venkataraman, et al., "PiCam: An Ultra-Thin High Performance Monolithic Camera Array." *ACM Transactions on Graphics,* 32 (6) 2014). Any suitable number of cameras in any suitable arrangement may be used, some examples of which are described below. Each camera of the array provides an image that is at or near the resolution of the output image, and the resulting image data is combined using a neural network, such as those described above. Such a neural network may be trained to manage the image disparity from the camera array as well as to perform denoising and deblurring. Image disparity arises due to the cameras being separated. Although the images can be registered together, each camera will have a slightly different view of the scene. Simply correcting the disparity by translation of the image may result in a local correction, but objects at different depths and at different points in the field will have different disparities. As such, a simple single geometric transformation for each camera may not correct for all such disparities. In contrast, a neural network trained on ground truth images compared to images acquired via such a camera array may correct such disparities globally in an image.

Figure 20:
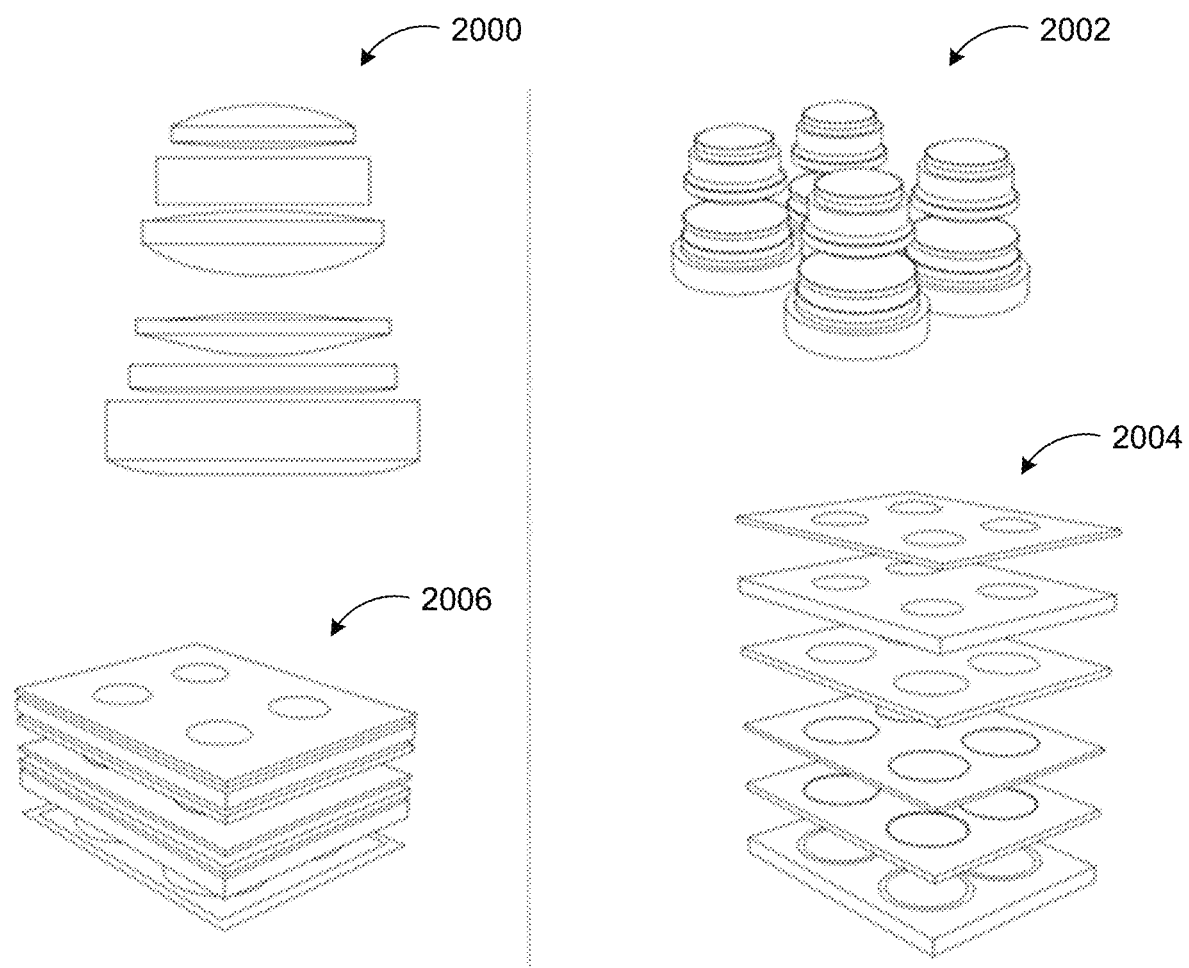
FIG. 20 shows schematic views of an example camera system, an example array of camera systems, and an example integrated camera array.

In some examples, the cameras of a camera array may comprise separate camera modules. In other examples, a camera array, or a portion of a camera array, may be constructed in an integrated fashion so that all cameras of the integrated array form images on a same image sensor. For example, the camera lenses may be formed in a single integrated block, or may be provided as individual camera lens assemblies that are positioned in front of a same image sensor. As a more specific example, FIG. 20 shows schematic representations of (a) an example single 6-element lens design, at 2000; (b) four such lens assemblies in an example 2×2 camera array, at 2002 (other array sizes and geometries may be used in other examples); (c) an exploded view, at 2004, of an integrated camera array comprising a layered construction in which each layer of the stack comprises one of the elements of lens design 2000 arrayed in a 2×2 fashion; and (d) the integrated camera array of 2004 in an assembled stack construction, at 2006.

Figure 21:
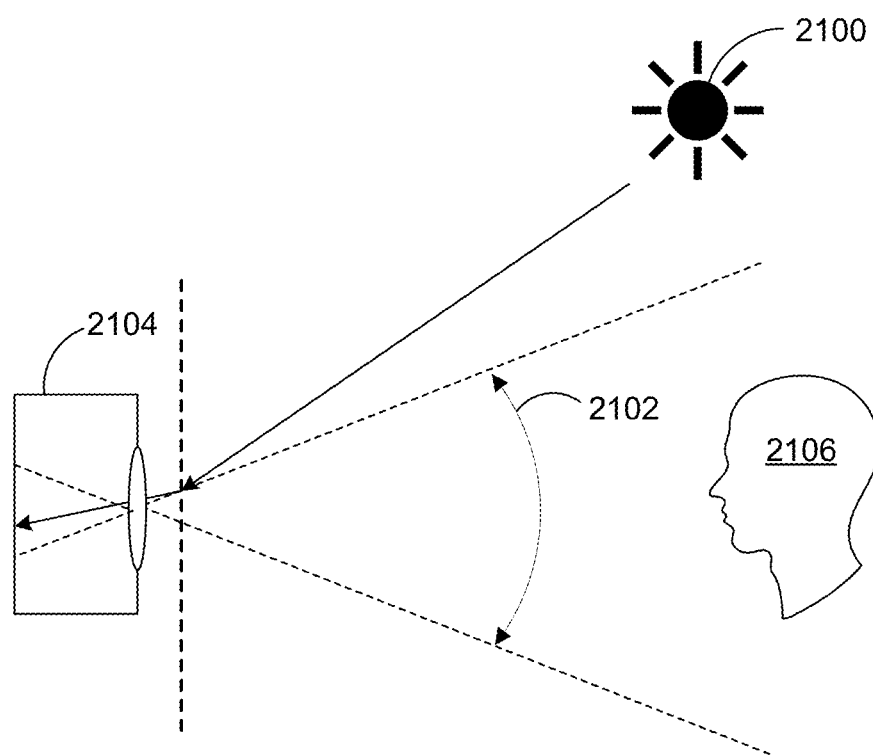
FIG. 21 shows a schematic depiction of an example scenario in which light from a light source outside of a field of view of a camera causes a diffraction pattern to appear in an image acquired by the camera.
Figure 22:
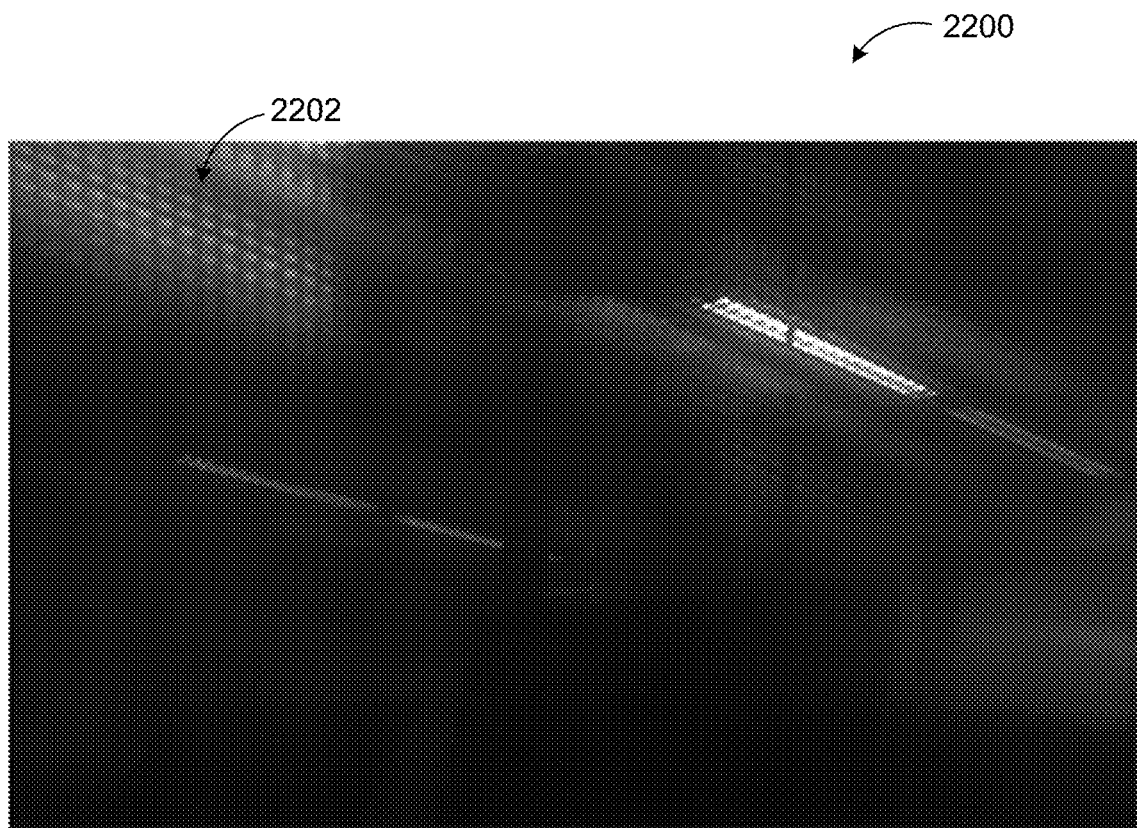
FIG. 22 shows an image comprising a diffraction pattern arising from a light source outside of the field of view of a camera.

The use of a camera array (such as camera array 2002 and integrated camera array 2004) may provide advantages over a single behind-display camera in settings in which the diffraction of the light through the display occurs in the presence of bright light sources. Common use scenarios for cameras on computing devices are self-portraits ("selfies") and videoconferencing, both of which may occur in uncontrolled lighting environments. As an example, in a home or office setting, the illuminance on the subject's face may be on the order of fifty lux, such that the facial luminance may be on the order of ten nits. However, there may be light sources in the room having a luminance on the order of 10,000-100,000 nits. In such environments, an auto gain system in the host device firmware or in the ISP of the camera may set the exposure level such that the face is correctly exposed. However, even though the relative diffraction efficiency through the screen in the high orders (at large angles) may be very low, e.g. 0.1%, the image illuminance due to diffraction from the light source may exceed that from the face. In cases where the light source is in the field of view and forms part of the image, a neural network may be trained to deal with the light source. In other cases, the light source itself may lie outside of the field of view of the camera, yet the diffracted light appears inside the field of view. In this case there is less information for the neural network regarding the distribution of the light sources, which may complicate image recovery. FIG. 21 schematically illustrates an example of such a scenario, where a bright light source 2100 is outside of a field of view 2102 of a camera 2104 (which represents a behind-display camera) while a main subject 2106 is within the field of view 2102. FIG. 22 shows an example image 2200 image acquired under conditions in which a strong light source is just outside the field of view. In image 2200, a diffraction pattern 2202 arising from the out-of-view light source can be seen extending across an upper portion of the image.

Figure 23:
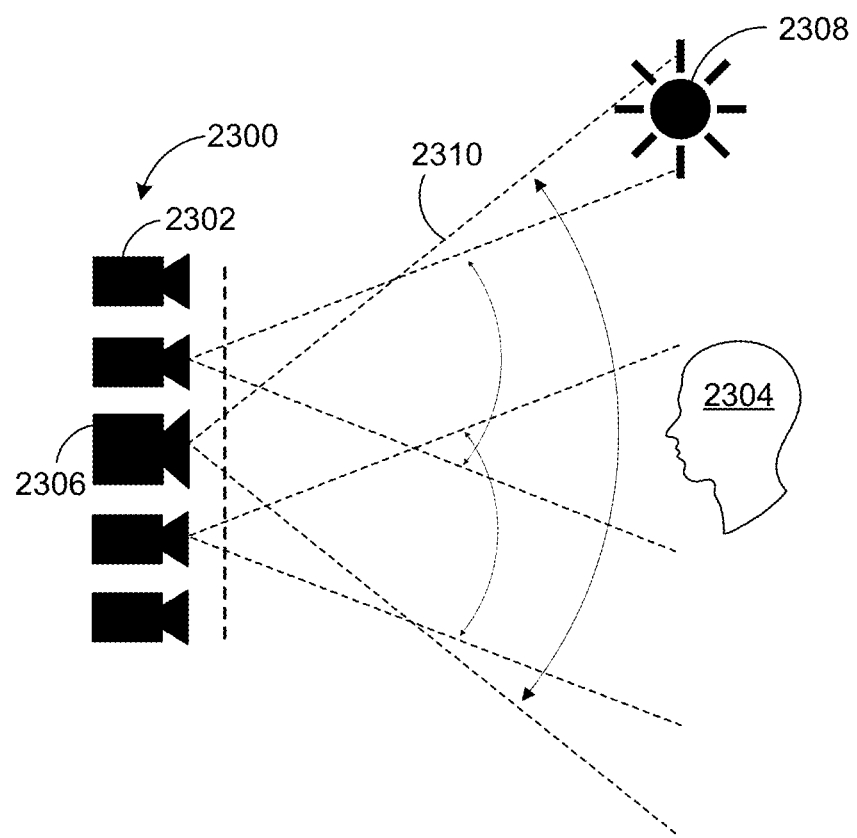
FIG. 23 shows a schematic depiction of an example behind-display imaging system comprising a camera array having a wider angle camera and a plurality of narrower angle cameras.

To mitigate the effects of light sources that are out of the field of view of a behind-display camera, at least one camera in the array may be configured to identify such out-of-view light sources. In some examples, the camera may be a wide-angle camera, such that the width of the field of view is sufficient to capture higher diffraction orders from the screen. FIG. 23 schematically shows an example of such a camera array 2300, which comprises four narrower angle cameras 2302 configured to sense a main subject 2304, and one wider angle camera 2306 configured to sense light sources out of view of the narrower angle cameras 2302, such as light source 2308.

The additional width of the field of view 2310 for wider angle camera 2306 may be selected based at least partially upon a diffraction efficiency of the screen as a function of angle ($E(\theta)$), and also at least partially upon a luminance range, which can also be called the capture range (R). The capture range R is the ratio of the lowest scene luminance to the maximum light luminance. The maximum additional angle $\theta_{max}$ is given by the solution for $\theta$ in $E(\theta)=R$. In other words, the wider angle camera lens may be selected in some examples to capture all light that has relative diffraction efficiency greater than R.

Diffraction peaks will occur at values of $\theta$ given by the grating equation ($\sin(\theta)=m\lambda/d$, where m is integer, $\lambda$, is the wavelength and d the pixel pitch). The relative diffraction efficiency versus angle is determined by the individual slit width, $\alpha$, as follows.

$$E(\theta) = \text{sinc}^2\left(\frac{a\pi}{\lambda}\sin\theta\right) \quad \text{Equation (3)}$$

Substituting for the values of $\sin(\theta)$ from the grating equation, the relative diffraction efficiencies are given by the following.

$$E(m) = \text{sinc}^2\left(\frac{a\pi}{d}m\right) \quad \text{Equation (4)}$$

As an example, to accommodate a range of intensities of 1,000:1, $E(m)=0.001$. By way of a more specific example, consider an array of pixel pitch 100 μm with slits of width 20 μm. The solution for the largest m is m=47. The $47^{th}$ diffraction order occurs at an angle of 18°, indicating that the wide-angle lens may be selected to accommodate a total angle equal to the original lens plus twice 18°. Where the narrower angle camera lenses have a field of view of +/−35° horizontal and around +/−28° vertical, the wider angle lens may be selected to accommodate a field of view of 71°×64°. This example demonstrates that, although the first order diffraction angle may be small for typical display devices, a wider angle lens may be selected to have a larger field of view than a simple first diffraction order calculation may indicate.

In such examples, the wider angle image may be acquired with lower gain than the narrower angle cameras. However, in a single-sensor implementation, the exposure time and analog gain are fixed for the whole sensor. In this case an attenuating optical filter (a neutral density filter) may be used over the wider angle camera aperture so that the bright lights remain within the capture range of the sensor.

The use of a camera array affords the opportunity to utilize subtractive color. The conventional approach to implementing color on a sensor is to place a red/green/blue (RGB) (or red/green/green/blue (RGGB)) filter array over the sensor pixels in the so-called Bayer pattern. The image is then recovered by interpolation over this array of pixel values. RGB is an additive color scheme in which the individual spectra color filter spectra do not significantly overlap. CMY is an alternative coding scheme in which the spectra do significantly overlap. An advantage of CMY is that each of the C, M and Y filters is roughly twice as wide as an individual R, G or B. As such, there is an increase in optical throughput compared to RGB. This may provide a signal to noise advantage over RGB filters. In some examples, CMY filters may be implemented at the pixel level, while in other examples the C, M and Y filters may be placed over individual cameras in a camera array, rather than in a Bayer-like matrix dispersed over individual pixels. An RGB implementation may have the filters disposed in a like manner. The RGB and/or the CMY implementations may be augmented by the addition of a clear channel (W) which accepts all visible wavelengths. This may afford signal to noise advantages, but also may pose challenges in reconstructing accurate color. However, in the context of a behind-display camera array with reduced signal levels, the improved signal to noise ratio may be favored over preserving nuances of color. FIG. 24 schematically illustrates various example color filter arrangements shown in a 3×3 array that represents a 3×3 camera array. In this figure, RBG denotes a Bayer color filter array on a camera, whereas individual letters indicate individual color filters located over a corresponding camera. More particularly, filter arrays 2402 and 2404 illustrate various example Bayer array arrangements, 2406 and 2408 illustrate various individual RGB and RGBW filter arrangements, and 2410-2414 illustrate various CMY and CMYW arrangements. In other examples, arrays of other sizes/dimensions may utilize any other suitable arrangement of color filters.

Figure 25:
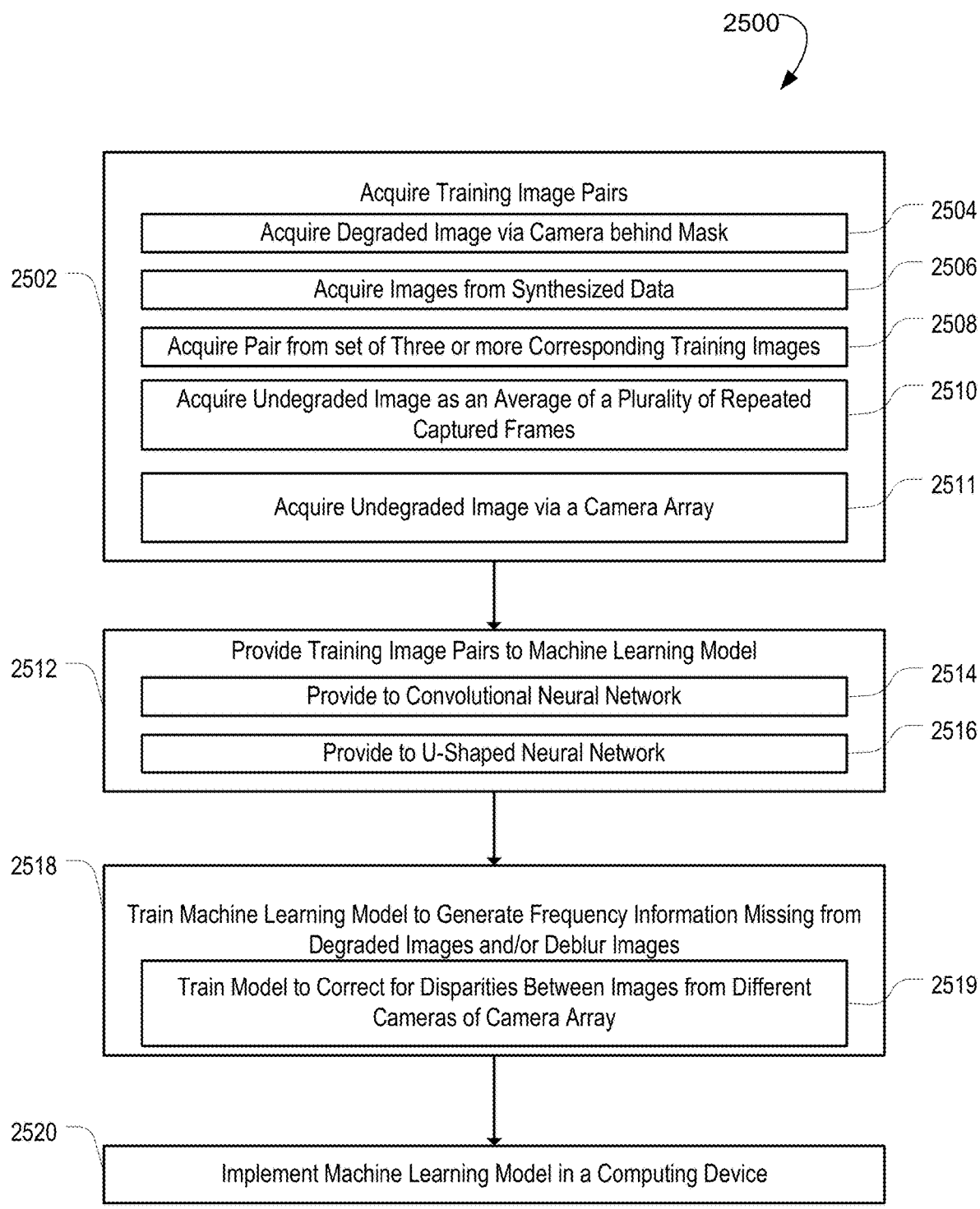
FIG. 25 shows a flowchart for an example method for training a machine learning model to restore a degraded image.

FIG. 25 shows an example computer-implemented method 2500 for training a machine learning model. The method includes, at step 2502, acquiring training image pairs. In some examples, the training image pairs are acquired using a mask positioned in front of a camera, such as in the data acquisition pipeline 1000 described above, as indicated at 2504. In other examples, the training image pairs comprise synthesized data, as indicated at 2506. While described herein in the context of image pairs, in some examples, the training image pair is a part of a set of three or more corresponding training images, as indicated at 2508. Further, in some examples, a noise-free image is acquired as an average of a plurality of repeated captured frames, as indicated at step 2510. Additionally, in some examples, the acquiring the degraded image comprises acquiring the degraded image via a camera array, as indicated at 2511. In some such examples, a plurality of lenses focus an image on a same image sensor, while in other examples each of two or more cameras includes a separate image sensor. Further, in some such examples, the camera array may comprise one or more wider angle cameras to locate light sources outside of a field of view of one or more narrower angle cameras of the camera array.

At 2512, method 2500 comprises providing the training image pairs to a machine learning model. In some examples, the training image pairs are provided to a convolutional neural network as in step 2514. In some examples, the training image pairs are provided to a U-shaped neural network, as in step 2516. At 2518, method 2500 comprises training the machine learning model to generate missing frequency information and/or deblur images. Further, in some examples, the machine learning model may be trained to correct for disparities between images from different cameras of a camera array, as indicated at 2519.

Figure 26:
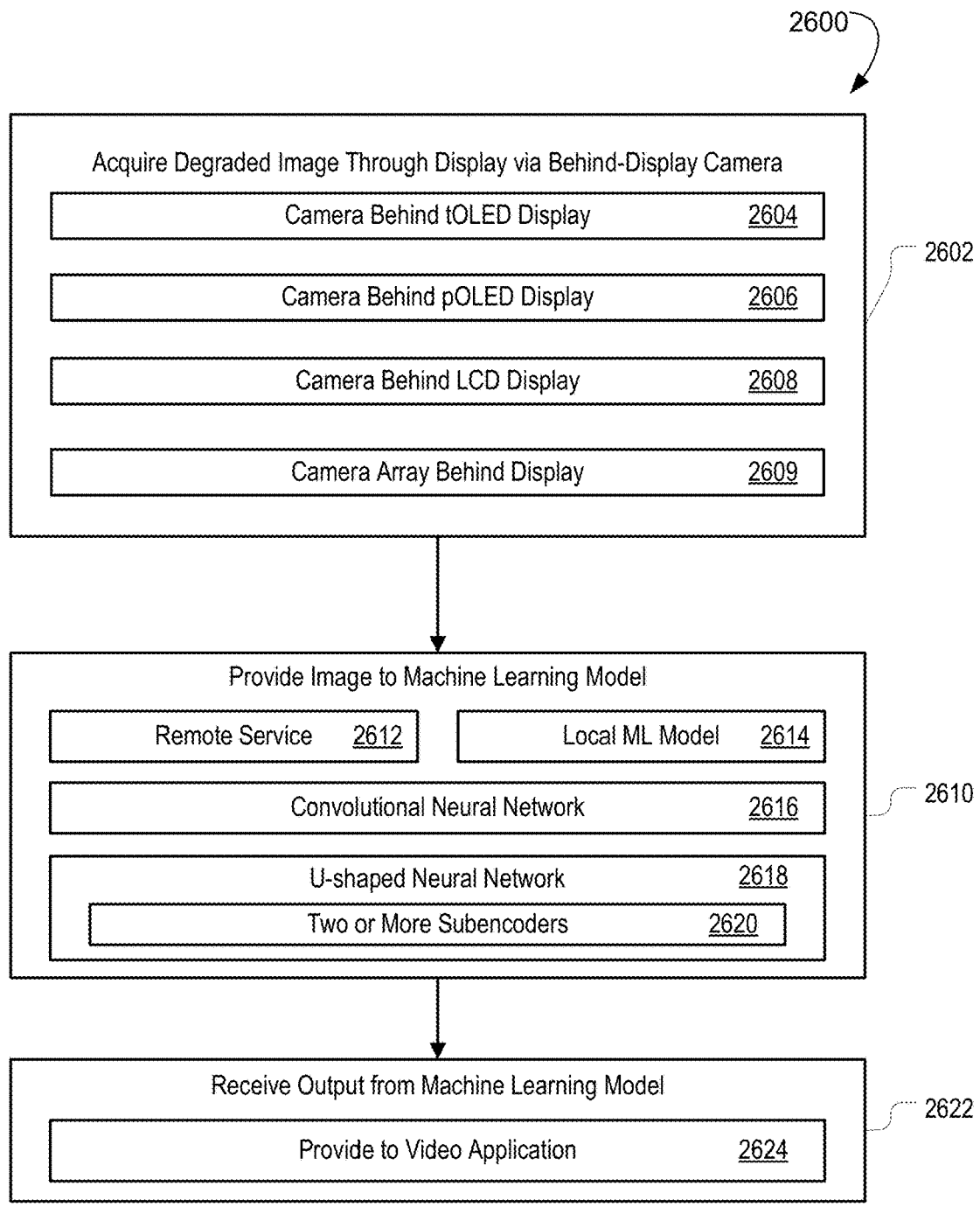
FIG. 26 shows a flowchart illustrating an example method for restoring an image via a machine learning model.

FIG. 26 shows an example method 2600 for restoring a degraded image via a machine learning model that has been trained, for example, according to method 2500. At 2602, method 2600 comprises acquires a degraded image via a behind-display camera. In various examples, method 2600 comprises acquiring a degraded image from a camera behind a tOLED display 2604, a camera behind a pOLED display 2606, or an LCD display 2608. Further, in various examples, method 2600 includes acquiring the degraded image via a camera array positioned behind the display 2609, which may provide a greater signal to noise ratio than the use of a single camera behind the display.

Method 2600 further comprises providing the degraded image to a machine learning model, at 2610, which outputs the restored image at 2622. In some examples the restored image is output in real time or near-real time, for example, to a video application 2624, such as a video conferencing application.

In some examples, the machine learning model is hosted by remote service 2612. In other examples, the machine learning model may be local to the imaging device, as indicated at 2614. In yet other examples, computer-executable logic to perform the image restoration may be distributed between the local device and a remote system. Any suitable machine learning model architecture may be used to perform the image recovery. In some examples, a convolutional neural network 2616 is used, while in other examples, a U-shaped neural network 2618 is used. In some such examples, the U-shaped neural network comprises two or more subencoders 2620.

In some embodiments, the methods and processes described herein may be tied to a computing system of one or more computing devices. In particular, such methods and processes may be implemented as a computer-application program or service, an application-programming interface (API), a library, and/or other computer-program product.

Figure 27:
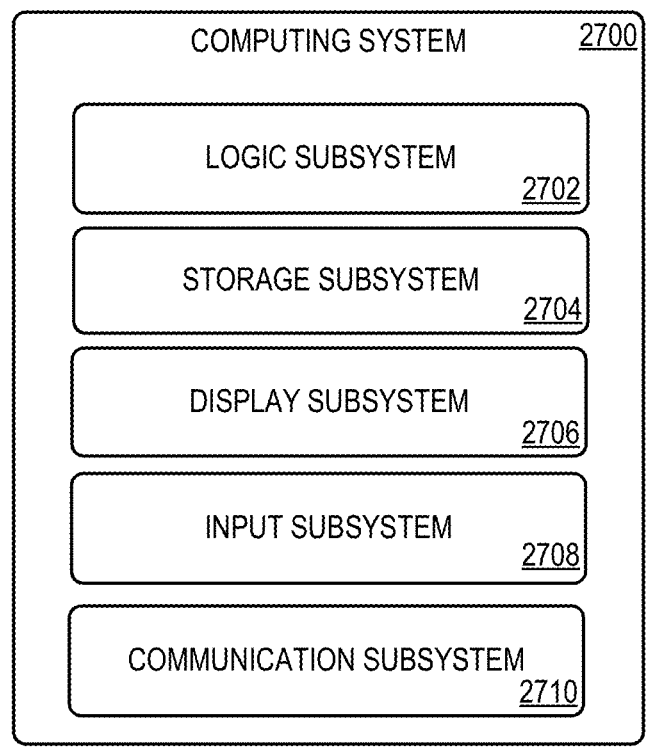
FIG. 27 shows a block diagram illustrating an example computing system.

FIG. 27 schematically shows a non-limiting embodiment of a computing system 2700 that can enact one or more of the methods and processes described above. Computing system 2700 is shown in simplified form. Computing system 2700 may take the form of one or more personal computers, server computers, tablet computers, home-entertainment computers, network computing devices, gaming devices, mobile computing devices, mobile communication devices (e.g., smart phone), and/or other computing devices.

Computing system 2700 includes a logic subsystem 2702 and a storage subsystem 2704. Computing system 2700 may optionally include a display subsystem 2706, input subsystem 2708, communication subsystem 2710, and/or other components not shown in FIG. 27.

Logic subsystem 2702 includes one or more physical devices configured to execute instructions. For example, the logic subsystem may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic subsystem 2702 may include one or more processors configured to execute software instructions. Additionally or alternatively, the logic subsystem may include one or more hardware or firmware logic subsystems configured to execute hardware or firmware instructions. Processors of the logic subsystem may be single-core or multi-core, and the instructions executed thereon may be configured for sequential, parallel, and/or distributed processing. Individual components of the logic subsystem optionally may be distributed among two or more separate devices, which may be remotely located and/or configured for coordinated processing. Aspects of the logic subsystem may be virtualized and executed by remotely accessible, networked computing devices configured in a cloud-computing configuration.

Storage subsystem 2704 includes one or more physical devices configured to hold instructions executable by the logic subsystem to implement the methods and processes described herein. When such methods and processes are implemented, the state of storage subsystem 2704 may be transformed—e.g., to hold different data.

Storage subsystem 2704 may include removable and/or built-in devices. Storage subsystem 2704 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage subsystem 2704 may include volatile, nonvolatile, dynamic, static, read/write, read-only, random-access, sequential-access, location-addressable, file-addressable, and/or content-addressable devices.

It will be appreciated that storage subsystem 2704 includes one or more physical devices. However, aspects of the instructions described herein alternatively may be propagated by a communication medium (e.g., an electromagnetic signal, an optical signal, etc.) that is not held by a physical device for a finite duration.

Aspects of logic subsystem 2702 and storage subsystem 2704 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The term "program" may be used to describe an aspect of computing system 2700 implemented to perform a particular function. In some cases, a program may be instantiated via logic subsystem 2702 executing instructions held by storage subsystem 2704. It will be understood that different programs may be instantiated from the same application, service, code block, object, library, routine, API, function, etc. Likewise, the same program may be instantiated by different applications, services, code blocks, objects, routines, APIs, functions, etc. The term "program" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

When included, display subsystem 2706 may be used to present a visual representation of data held by storage subsystem 2704 This visual representation may take the form of a graphical user interface (GUI). As the herein described methods and processes change the data held by the storage subsystem, and thus transform the state of the storage subsystem, the state of display subsystem 2706 may likewise be transformed to visually represent changes in the underlying data. Display subsystem 2706 may include one or more display devices utilizing virtually any type of technology. Such display devices may be combined with logic subsystem 2702 and/or storage subsystem 2704 in a shared enclosure, or such display devices may be peripheral display devices.

When included, input subsystem 2708 may comprise or interface with one or more user-input devices such as a keyboard, mouse, touch screen, game controller, and/or camera (e.g. a behind-display camera). In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera (behind-display or other) for machine vision and/or gesture recognition; a head tracker, eye tracker, accelerometer, and/or gyroscope for motion detection and/or intent recognition; as well as electric-field sensing componentry for assessing brain activity.

When included, communication subsystem 2710 may be configured to communicatively couple computing system 2700 with one or more other computing devices. Communication subsystem 2710 may include wired and/or wireless communication devices compatible with one or more different communication protocols. As non-limiting examples, the communication subsystem 2710 may be configured for communication via a wireless telephone network, or a wired or wireless local- or wide-area network. In some embodiments, the communication subsystem 2710 may allow computing system 2700 to send and/or receive messages to and/or from other devices via a network such as the Internet.

Another example provides a method of training a machine learning model, the method comprising inputting training image pairs into the machine learning model, each training image pair comprising an undegraded image and a degraded image that represents an appearance of the undegraded image to a behind-display camera, and training the machine learning model using the training image pairs to generate frequency information that is missing from the degraded images. The method may additionally or alternatively include providing the image pairs to a convolutional neural network. The method may additionally or alternatively include providing the image pairs to a U-shaped neural network. The undegraded training image may additionally or alternatively comprise an average of a plurality of repeated captured frames. The method may additionally or alternatively comprise acquiring each degraded image via a camera positioned behind a mask. The method may additionally or alternatively comprise acquiring each degraded image via a camera array. The training image pair may additionally or alternatively be a part of three or more corresponding training images. The method may additionally or alternatively comprise, after training the machine learning model, implementing the machine learning model in a computing device for imaging via a behind-display camera.

Another example provides a method of obtaining a restored image, the method comprising acquiring a degraded image through a display via a behind-display camera, the degraded image comprising missing frequency information in a frequency region due to having been acquired through a display, providing the degraded image as input to a machine learning model, and receiving an output from the machine learning model, the output comprising a restored image comprising generated frequency information in the frequency region. The method may additionally or alternatively include sending the image to a remote service hosting the machine learning model. The method may additionally or alternatively include executing the machine learning model locally. The method may additionally or alternatively include acquiring the degraded image via a camera array. The method may additionally or alternatively include providing the restored image to a video application. The method may additionally or alternatively include providing the degraded image into a convolutional neural network. The method may additionally or alternatively include providing the degraded image into a U-shaped neural network. The U-shaped neural network may additionally comprise two or more sub-encoders.

Another example provides a computing device comprising a logic subsystem and a storage subsystem storing instructions executable by the logic subsystem to receive a degraded image acquired via a behind-display camera, the degraded image comprising missing frequency information in a frequency region due to having been acquired through a display, provide the image as input into a machine learning model, and receive an output from the machine learning model of a restored image, the restored image comprising generated frequency information in the frequency region. The computing device may additionally or alternatively comprise the display and the behind-display camera, and wherein the display comprises an array of openings. The behind-display camera may additionally or alternatively comprise a camera array. The computing device may additionally or alternatively be remote from the behind-display camera.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A method of training a machine learning model, the method comprising:
inputting training image pairs into the machine learning model, the machine learning model comprising a U-shaped neural network comprising a first sub-encoder and a second sub-encoder in parallel with the first sub-encoder, each training image pair comprising an undegraded image and a degraded image that represents an appearance of the undegraded image to a behind-display camera, the degraded image comprising loss of mid-frequency information due to diffraction-related blurring, the mid-frequency information within a range of 2 to 8 cycles per degree; and training the machine learning model using the training image pairs to generate mid-frequency information to correct for the loss of mid-frequency information due to the diffraction-related blurring, wherein the first sub-encoder is trained to compute residual details and the second sub-encoder is trained to learn content encoding.

2. The method of claim 1, wherein providing training image pairs to the machine learning model comprises providing the image pairs to a convolutional neural network.

3. The method of claim 1, wherein the undegraded training image comprises an average of a plurality of repeated captured frames.

4. The method of claim 1, further comprising acquiring each degraded image via a camera positioned behind a mask.

5. The method of claim 1, wherein the degraded image comprises an image acquired via a camera array.

6. The method of claim 1, wherein the training image pair is a part of three or more corresponding training images.

7. The method of claim 1, further comprising, after training the machine learning model, implementing the machine learning model in a computing device for imaging via a behind-display camera.

* * * * *